US008879024B2

(12) United States Patent
Suzuki et al.

(10) Patent No.: US 8,879,024 B2
(45) Date of Patent: Nov. 4, 2014

(54) LIQUID CRYSTAL DISPLAY WITH A FLUORESCENT BACKLIGHT EMITTING POLARISED LIGHT

(75) Inventors: Masayoshi Suzuki, Tokyo (JP); Naoya Fujiwara, Yokohama (JP); Atsutaka Manabe, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 382 days.

(21) Appl. No.: 13/063,361

(22) PCT Filed: Aug. 13, 2009

(86) PCT No.: PCT/EP2009/005866
§ 371 (c)(1),
(2), (4) Date: May 31, 2011

(87) PCT Pub. No.: WO2010/028728
PCT Pub. Date: Mar. 18, 2010

(65) Prior Publication Data
US 2011/0216271 A1    Sep. 8, 2011

(30) Foreign Application Priority Data

Sep. 10, 2008  (GB) .................................. 0816557.3

(51) Int. Cl.
*G02F 1/1335*       (2006.01)
(52) U.S. Cl.
CPC *G02F 1/13362* (2013.01); *G02F 2001/133614* (2013.01); *G02F 1/133621* (2013.01); *G02F 2001/133543* (2013.01); *G02F 2001/133557* (2013.01); *G02F 2201/086* (2013.01)
USPC .............................. 349/61; 349/164; 349/165
(58) Field of Classification Search
USPC .................. 349/115, 164–165, 61–32, 64–65
See application file for complete search history.

(56) References Cited

U.S. PATENT DOCUMENTS

| 5,126,214 A | 6/1992 | Tokailin et al. |
| 5,666,174 A | 9/1997 | Cupolo, III |
| (Continued) | | |

FOREIGN PATENT DOCUMENTS

| EP | 0889350 A1 | 1/1999 |
| JP | 3-152897 A | 6/1991 |
| (Continued) | | |

OTHER PUBLICATIONS

Swanson, S. et al, "Stable and Efficient Fluorescent Red and Green Dyes for External and Internal Conversion of Blue OLED Emission," American Chemical Society, Chemical Materials, 2003, 15, pp. 2305-2312.

(Continued)

*Primary Examiner* — James Dudek
(74) *Attorney, Agent, or Firm* — Millen, White, Zelano & Branigan, P.C.

(57) ABSTRACT

The instant invention relates to electro-optical switching elements and displays comprising them. In particular, it relates to electro-optical switching elements comprising one or more light conversion means capable to convert light (e.g. ambient light and/or light from a backlight system), wherein each of said light conversion means o is capable to convert the state of polarization of the light from non-polarized light either to linear polarized light or to circular polarized light and, at the same time, o optionally is capable to shift the wavelength of the light to longer values and—at least one of said conversion means o is capable to shift the wavelength of the light to longer values and—a liquid crystal material, which is capable of switching,—one or more means to polarize light, and— optionally a means for illumination such as e.g. a backlight.

19 Claims, 13 Drawing Sheets

(56) References Cited

U.S. PATENT DOCUMENTS

Figure 1:
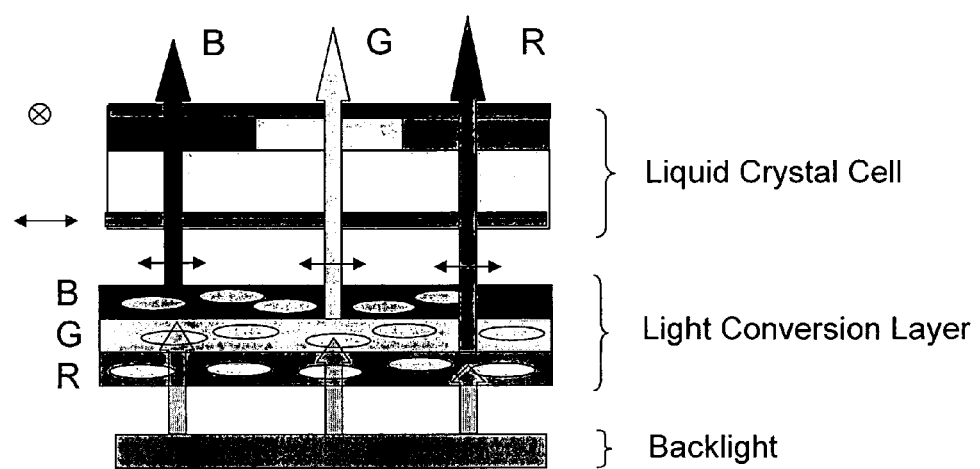

| | | |
|---|---|---|
| 5,998,925 A | 12/1999 | Shimizu et al. |
| 6,069,440 A | 5/2000 | Shimizu et al. |
| 6,122,465 A | 9/2000 | Hiyama et al. |
| 6,295,106 B1 | 9/2001 | Fukuzawa et al. |
| 6,580,224 B2 | 6/2003 | Ishii et al. |
| 6,606,135 B2 | 8/2003 | Nakanishi et al. |
| 6,614,179 B1 | 9/2003 | Shimizu et al. |
| 6,654,079 B2 | 11/2003 | Bechtel et al. |
| 6,891,583 B1 | 5/2005 | Smith et al. |
| 7,142,360 B2 | 11/2006 | Umeya |
| 7,164,454 B2 | 1/2007 | Numata et al. |
| 7,365,906 B2 | 4/2008 | Umeya |
| 7,420,065 B2 | 9/2008 | Yoshida et al. |
| 7,750,984 B2 * | 7/2010 | Ha et al. ............ 349/25 |
| 7,864,284 B2 | 1/2011 | Morii et al. |
| 7,905,613 B2 | 3/2011 | Watanabe et al. |
| 7,936,412 B2 | 5/2011 | Numata et al. |
| 2001/0038426 A1 | 11/2001 | Bechtel et al. |
| 2002/0039157 A1 | 4/2002 | Nakanishi et al. |
| 2005/0041174 A1 | 2/2005 | Numata et al. |
| 2005/0253112 A1 | 11/2005 | Kelly et al. |
| 2006/0290872 A1 | 12/2006 | Morii et al. |
| 2007/0139582 A1 | 6/2007 | Numata et al. |
| 2009/0161037 A1 | 6/2009 | Lazarev |

FOREIGN PATENT DOCUMENTS

| | | |
|---|---|---|
| JP | 4-40413 A | 2/1992 |
| JP | 7-253575 A | 10/1995 |
| JP | 8-306954 A | 11/1996 |
| JP | 9-61813 A | 3/1997 |
| JP | 2795932 B2 | 9/1998 |
| JP | 11-241069 A | 9/1999 |
| JP | 2001-100203 A | 4/2001 |
| JP | 2001-174636 A | 6/2001 |
| JP | 2001174779 A | 6/2001 |
| JP | 2002-062530 A | 2/2002 |
| JP | 2002-116325 A | 4/2002 |
| JP | 2002-358812 A | 12/2002 |
| JP | 2003-233070 A | 8/2003 |
| JP | 2003-264081 A | 9/2003 |
| JP | 3503139 B2 | 3/2004 |
| JP | 2004-263179 A | 9/2004 |
| JP | 2005-003823 A | 1/2005 |
| JP | 2005-048105 A | 2/2005 |
| JP | 2005-062692 A | 3/2005 |
| JP | 2006-269819 A | 10/2006 |
| JP | 2006-299207 A | 11/2006 |
| JP | 2007-003779 A | 1/2007 |
| JP | 2007-063365 A | 3/2007 |
| JP | 2007-063366 A | 3/2007 |
| JP | 2007-178902 A | 7/2007 |
| JP | 2007-262417 A | 10/2007 |
| JP | 2007-299560 A | 11/2007 |
| JP | 2007-308418 A | 11/2007 |
| JP | 2008-091282 A | 4/2008 |
| JP | 2008-097032 A | 4/2008 |
| WO | 98/05078 A1 | 2/1998 |
| WO | 2004/003108 A1 | 1/2004 |
| WO | 2007/122389 A2 | 11/2007 |

OTHER PUBLICATIONS

Matsuo, K., "CCFL"; pp. 153-157 (translation not readily available).

Harada, H. et al. "Full color photo-addressable electronic paper using cholesteric liquid crystals and organic photoconductors." Information Display Dec. 2008. Abstract.

Adachi, M. et al., "Enhancement of blue-light-emission properties for OLED displays by using a polarized light recycling structure," Journal of the SID, 16/8, 2008, pp. 875-881.

Bjorknas, K. et al., "Circularly polarised emission from dyes embedded in a chiral polymer," Proceedings of SPIE, vol. 4464, 2002, pp. 122-133. (cited in ISR in corresp PCT/EP2009/005866).

International Search Report, dated Dec. 3, 2009, issued in corresponding PCT/EP2009/005866.

* cited by examiner

LIQUID CRYSTAL DISPLAY WITH A FLUORESCENT BACKLIGHT EMITTING POLARISED LIGHT

FIELD OF THE INVENTION

The present invention relates to electro-optical switching elements and their use in electro-optical displays, as well as to these displays. In particular, the present invention relates to electro-optical switching elements leading to bright images with excellent visibility under bright ambient light conditions and hence with low power consumption and additionally featuring long term reliability.

STATE OF THE ART AND PROBLEMS TO BE SOLVED

Electro-optical switching elements using liquid crystal material with helical structure, optionally comprising a fluorescent dye, as lighting and/or reflecting material with improved contrast by avoiding the otherwise typical strong selective reflection of ambient light by the liquid crystal helical structure are described in not yet laid open Japanese patent application JP 2008-073141.

Advanced liquid crystal displays (LCDs) have been developed featuring a large size screen and a wide field of view. Hence, their range of applications is rather broad extending from mobile phones over computer monitors to television sets. There are several more types of applications like personal digital assistants (PDAs), handheld input devices, instruments for transportation machines like land vehicles, air craft or vessels, displays for global positioning devices (GPS)/navigation aid devices and, recently, large screen LCDs are even applied to digital signage. In many of these applications, like e.g. for digital signage, clear visibility under bright ambient lighting conditions such as under direct sunlight conditions is strongly requested. Clear visibility under outside bright conditions is also required e.g. for mobile phone and digital still camera applications. For TV and monitor use, clear visibility under bright conditions is also important. Further, LCDs are required having a wide range of colour expression, as well as a good long term reliability.

Laid open Japanese patent application JP 2007-299560 (A) proposes to use light emitting diodes (LEDs) as a backlight source replacing the previously used cold cathode fluorescent lamp to increase the range of colour expression. When LEDs are used as a backlight for an LCD, two different methods of their employment are suggested. The first method is to use three different kinds of LEDs, one each corresponding to one of the three primary colours, red, green and blue (R, G, B), and the second method is to illuminate the LCD with almost white light, obtained e.g. from a blue LED with additional yellow fluorescent materials, as described in Japanese patent JP 3503139 (B2). However, the method of JP 2007-299560 (A) expands the range of colour expression of the LCDs, but it does not improve their brightness, whereas the method of JP 3503139 (B2) does not lead to a sufficiently wide range of colour expression.

The width of the range of colour expression of LCDs may be improved significantly by the use of LEDs as a backlight. For example a deeper colour red may be thus represented. However, this use of LEDs does not improve the brightness of the LCDs. Consequently, there still is a strong demand for LCDs simultaneously having a higher brightness and lower power consumption.

A well known method to increase the brightness of LCDs is their operation in the colour sequential mode, which eliminates the need for colour filters, as is described e.g. in laid open Japanese patent application JP 2001-174779 (A), which does eliminate the need to use colour filters, which absorb a significant amount of light. However, colour sequential operation of LCDs requires an increase of the response speed, i.e. the switching speed, of the liquid crystal layer and neither a suitable liquid crystal material, nor an appropriate driving method have been suggested.

Various other methods to improve the brightness of LCDs have been proposed. Some of which are briefly mentioned in the following. Laid open Japanese patent application JP 2001-100203 (A) proposes to use a backlight emitting UV radiation, which is subsequently converted by suitable phosphors into light of the appropriate colours matching the colours of a colour filter in order to achieve an LCD with improved brightness. This approach does have at least three significant draw backs. The first one is that it requires the use of colour filters absorbing quite some part of the light. The second one is that the structure proposed can not utilize ambient light. And the third one is that energetic light, i.e. light having a short wavelength and in particular UV radiation is detrimental to liquid crystal materials and peripheral materials, which is not preferable for the long term reliability of LCDs.

Laid open Japanese patent application JP H07-253575 (A) suggests an LCD using ambient light, which is divided into three primary colours by means of a hologram and then the light of each is passed through its corresponding part of the display presenting the respective colour, also eliminating the necessity to use a colour filter. This type of displays requires a structure, which is comparatively complicated and not straight forward to fabricate. Further, it also can not utilize reflected ambient light. And also this type of displays has the problem that the light with the shorter wavelengths causes degradation of liquid crystal materials and peripheral materials.

The use of a light source generating linearly polarized emission to increase the brightness of LCDs is described in laid open Japanese patent application JP 2001-174636 (A). But here again UV radiation with a wavelength of 365 nm is used to excite fluorescent dyes, leading to problems with the stability of the very fluorescent dyes of these LCDs and again of the liquid crystal materials and the peripheral materials. Besides that these LCDs utilize a dielectric mirror as a filter for the UV radiation, which poses another challenge for their production.

Liquid crystal displays operating with a backlight system, which use light conversion materials, either inorganic conversion phosphors or organic wavelength-converting materials, to shift the wavelength of the light of the light source of the backlight to shorter wavelengths are disclosed e.g. in U.S. Pat. No. 5,666,174, U.S. Pat. No. 6,654,079, US 2001/0038426 (A1), JP 2002-358812 (A) and JP 2007-178902 (A).

Linearly polarized light may be obtained, as described in laid open Japanese patent applications JP H04-040413 (A) and JP 2001-174636 (A), mentioned above, by aligning fluorescent material having an anisotropic molecular shape dispersed in a polymer matrix using elongation technique. Alternatively, linearly polarized light may obtained, as described in laid open Japanese patent application JP H08-306954 (A), by aligning fluorescent material having an anisotropic molecular shape on a rubbed alignment layer. According to laid open Japanese patent application JP H11-241069 (A) linearly polarized light may also be obtained by dispersing fluorescent molecules in a matrix of liquid crystals. In case the fluorescent materials are embedded in a matrix of polymerizable liquid crystal materials, the orientation of the fluorescent materials achieved after alignment of the matrix may be stabilized by polymerization of the polymerizable liquid crystal materials by exposure to heat or electromagnetic radiation. However, their degree of polarization is insufficient for most applications, further the long term stability of the device is not considered at all and the displays can not utilize reflected ambient light.

Further methods to obtain bright LCDs by the elimination of the necessity to use colour filters are described in laid open Japanese patent applications JP 09-061813 (A) and in JP 2005-062692 (A), which propose to separate the light from a light source into three primary colours. JP 09-061813 (A) suggests an LCD in which an array of prisms is used to divide the light from a light source into light of the three primary colours (red (R), green (G) and blue (B)), which then pass through different areas of liquid crystal switching layer, whereas JP 2005-062692 (A) describes an LCD in which a diffraction grating is used to divided the light from a light source is into three primary colours and each one of them is passed through its respective each pixel via a cylindrical lens array. Also these LCDs have the three problems described above, i.e. they can not utilize reflected ambient light, their complicated structure is difficult to fabricate and the light with short wavelengths causes deterioration of liquid crystal materials and of peripheral materials.

Laid open Japanese patent application JP 2003-233070 (A) proposes LCDs using a light conversion layer replacing the colour filter of conventional displays. Either said light conversion layer converts UV radiation emitted form a respective backlight into light of either one of the three primary colours (R, G, B,) or alternatively the blue light from a respective blue backlight is used in part directly for the blue part of the image displayed and in part converted into green and red light, respectively. Also here reflected ambient light can not be utilized. As the light from the backlight first passes through the liquid crystal switching layer and its colours is converted only subsequently, the problem of the degradation of the liquid crystal materials and of the peripheral materials arises, especially in the case that UV radiation from the backlight is used, as discussed above. In the case that blue light is used instead of UV radiation, the problem of the stability of the materials is improved to some degree, but ambient light leads to an excitation of the green and/or red fluorescent materials and hence leads to a poor contrast.

For digital still camera, mobile phone and digital signage which are mainly used outdoors, good visibility under bright ambient light conditions as well as high brightness is demanded, as mentioned above. Transflective LCDs for such applications are described in laid open Japanese patent application JP 2007-003779 (A). These are characterized by using spacers in the form of posts, which are located exclusively on the green pixels of the display. The LCDs are reported to have good visibility under bright ambient light conditions. However, the production of such LCDs requires a complicated fabrication process mainly because in these transflective LCD every pixel has to be divided into two areas, a transmissive area and a reflective, each having a different optimized cell gap. Further, as the pixels are divided into said two different areas, the transmissive area and the reflective, obviously their respective sizes are interdependent. I.e. when the transmissive area increases, the reflective area decreases and vice versa. Problems of the long term reliability of the liquid crystal materials and of the peripheral materials caused by light with a short wavelength are not addressed at all in this document.

A substance absorbing light having a wavelength shorter than 420 nm, in the form of an UV absorbing film is commercially available as "UV Cut Film Standard" from Sumitomo 3M, Japan may be used. Alternatively acrylate films and/or PET films having an appropriate thickness and size may be used. The absorbance of these materials depends on the thickness of the films, thus an appropriate thickness has to be selected. The thickness of the films should be low enough to suppress the absorption in the visible spectral region, i.e. in the region of wavelengths between 430 nm and 780 nm, which is used for displaying images and, at the same time, high enough to absorb the light in the UV region. For example the "UV Cut Film Standard", mentioned above, transmits 88% of the visible light and absorbs 99.5% of the radiation in the UV region. The second one of these figures means that the exposure to UV-radiation is reduced by a factor of 200 by the use of "UV Cut Film Standard" compared to an LCD without this film. Thus, the life time of an LCD having a life time of 4 years without a UV cut-off film, would be increased by the use of the "UV Cut Film Standard" to 800 years, indicating that there would be no problem at all with the long term reliability concerning exposure to UV radiation. In order to increase the transmittance for visible light to 99% the film thickness of "UV Cut Film Standard" is reduced to 0.4 times the value of the original one. This leads to an increase of the transmittance for UV radiation to 12%. In this case, the life time of an LCD is increased by a factor of 8.3 compared to that of an LCD having no UV cut-off filter. In this case, the life time of an LCD is increased from 4 years to 33 years by the use of the "UV Cut Film Standard". This improvement of the stability against exposure to UV radiation is already sufficient to solve the problem of the long term reliability of LCDs concerning UV radiation for most practically applications.

In the prior art, especially in the documents cited above the problem of the long term reliability of the LCDs including light diffusers and other optical elements, and, in particular the long term reliability of the liquid crystal layer has not been addressed sufficiently and in many cases it even has not been taken into account at all. In contrast, the documents of the prior art each favour a certain technology solving more or less only one single specific problem without proper regard to the other properties of the respective displays. I.e. none of them are providing an LCD having a bright image with practically sufficient good visibility even under bright ambient light conditions, featuring a low power consumption and at the same time showing a sufficient long term stability and reliability.

However, these properties are important and may even be decisive for TV and digital signage application as well as monitor and mobile phone application. Consequently, there is a strong need for LCDs having these properties.

PRESENT INVENTION

The LCDs according to the present invention comprise optical elements arranged in such a way that they utilize the light from the backlight system quite efficiently and further that the radiation from the backlight system does not include radiation having a high energy, preferably it does not include any UV radiation and more preferably also no blue light with short wavelengths. Preferably the wavelength of the light is 385 nm or more, more preferably 420 nm or more and most preferably 435 nm or more.

In a preferred embodiment of the present invention the LCDs have a unique combination and arrangement of optical elements so that they utilize reflected ambient light as well as the light from a backlight and hence, they lead to a bright image with clear visibility under bright ambient light conditions with low power consumption.

Converting the light from a backlight into linearly polarized light significantly enhances the efficiency of the utilization of the light from the backlight and removing the UV radiation having a short wavelength, e.g. of 385 nm or less, significantly improves the long term reliability of the LCDs.

According to the present invention, an electro-optical switching element is provided, comprising one or more light conversion means capable to convert light (e.g. ambient light and/or light from a backlight system), each of said light conversion means
is capable to convert the state of polarization of the light from non-polarized light either to linear polarized light or to circular polarized light and, at the same time,
optionally is capable to shift the wavelength of the light to longer values, preferably into visible light and
at least one of said conversion means
is capable to shift the wavelength of the light to longer values and
a liquid crystal material, which is capable of switching, preferably in the form of a layer, preferably provided with one or more means of electrical addressing of said liquid crystal material,
one or more means to polarize light, preferably an analyzer and optionally a polarizer, and
optionally a means for illumination, as e.g. a backlight.

The expression of the liquid crystal material being capable of switching means that the state of orientation of the liquid crystal material may be altered at least from one state to at least one other state by application of a force, preferably by electrically addressing it. The change of orientation may be, and preferably is, more or less continuous, in order to facilitate the representation of grey scales.

The light conversion means according to the present application may have different forms in a preferred embodiment they are comprising one or more layers, which are more or less flat, essentially continuous layers preferably covering essentially all liquid switching elements of the display. Preferably the layers are laminated to each other, respectively successively deposited one on the other. The conversion means, however, may also be structured, e.g. in a patterned way, such as e.g. being essentially congruent with the pixels or sub-pixels of a display, as will be explained in some detail below.

Preferably, according to the present invention at least one of the light conversion means capable to convert the state of polarization of the light and optionally to shift the wavelength of the light comprises or consists of a cholesteric liquid crystal, which preferably comprises one or more light emitting moieties, preferably one or more light emitting compounds as disclosed e.g. in not yet laid open Japanese patent application JP 2008-073141.

Preferably the electro-optical switching elements according to the present invention comprises one or more light enhancing means, which preferably comprise or consist of one or more layers of cholesteric LCs. In this case, the electro-optical switching elements, respectively their assembly, respectively the LCDs preferably comprise an optical component, which is capable to reduce or eliminate the selective reflection of said cholesteric liquid crystal as disclosed e.g. in not yet laid open Japanese patent application JP 2008-073141.

Preferably the electro-optical switching element according to the present invention comprises a back light system capable to emit blue light,
one light conversion means capable to convert the light from said backlight system, which is
capable to convert the state of polarization of the light, preferably into linearly polarized light or, in case the light is already linerly polarized to some degree, into more strongly linearly polarized light, i.e. into light having a higher degree of polarisation than that it had before and
optionally, at the same time, capable to shift the wavelength of the blue light to longer values,
at least one, preferably two additional light conversion means capable to convert the light from said backlight system, which is, respectively which are,
capable to convert the state of polarization of the light, preferably into linearly polarized light and
at the same time, capable to shift the wavelength of the light to longer values, preferably into green or one into red light and preferably one each into green and red light.

According to the present application, blue light preferably means light with a wavelength of 400 nm or more, i.e. including violet light, but no UV radiation, preferably it means light with a wavelength of 420 nm or more and, most preferably, of 435 nm or more.

According to the present invention all known LCD modes may be applied for the liquid crystal switching layer, like for example the twisted nematic (TN) mode, the vertical alignment (VA) mode, the in-plane-switching (IPS) mode, the fringe-field-switching (FFS) mode, the optically compensated bend (OCB) mode, the hybrid alignment nematic (HAN) mode and the guest-host (GH) mode. Even ferroelectric and blue phase modes are applicable. It has been found that the VA mode is particularly useful for the present invention. The latter holds in particular in case the liquid crystal switching layer is operated circularly polarized light. For the liquid crystal switching layers operating in the TN, OCB and HAN modes, one of the advantages using circularly polarized light is an improved process margin for aligning the rubbing direction between upper and lower substrates.

The light conversion means used according to the present invention may include one or more organic dyes and/or one or more inorganic phosphors.

As organic dyes, various kinds of fluorescent dyes and phosphorescent dyes may be beneficially used, such as laser dyes and/or light emissive dyes used in organic light emitting diodes. Respective laser dyes are commercially available from Exciton Corporation, USA via Indeco Corporation, Japan, whereas other suitable dyes are commercially available from American Dye Sources Inc., Canada.

Laser dyes with an emission wavelength in the blue spectral region, which may be used here, are e.g. commercially available from Exciton Corporation, USA via Indeco Corporation, Japan e.g. Coumarin460, Coumarin480, Coumarin481, Coumarin485, Coumarin487, Coumarin490, LD489, LD490, Coumarin500, Coumarin503, Coumarin504, Coumarin504T and Coumarin515. Besides these laser dyes, fluorescent dyes with an emission in the blue spectral region such as perylene, 9-amino-acridine, 12(9-anthroyloxy)stearic acid, 4-phenylspiro[furan-2(3H),1'-futalan]-3,3'-dione, N-(7-dimethylamino-4-methylcoumarynyl) maleimide and/or the dyes ADS135BE, ADS040BE, ADS256FS, ADS086BE, ADS084BE, which are commercially available from American Dye Sources Inc., Canada, may be used, too. These dyes may be used according to the present invention either individually or in the form of appropriate mixtures.

Laser dyes emitting in the green spectral region, which may be used here, are commercially available: e.g. Coumarin522, Coumarin 522B, Coumarin525 and Coumarin540A from Exciton Corporation, USA via Indeco Corporation, Japan and Coumarin 6,8-hydroxy-xynoline* from Sigma-Aldrich$^{Ltd.}$, Japan, a subsidiary of Sigma-Aldrich, USA. Besides these laser dyes, fluorescent dyes with an emission in the green spectral region such as the dyes ADS061GE, ADS063GE, ADS108GE, ADS109GE and ADS128GE from American Dye Sources Inc., Canada, may be used, too. Also these dyes may be used according to the present invention either individually or in the form of appropriate mixtures.

Laser dyes emitting in the red spectral region, which may be used here, are commercially available: e.g. DCM, Fluorol 555, Rhodamine 560 Perchlorate, Rhodamine 560 Chloride and LDS698 from Exciton Corporation, USA via Indeco Corporation, Japan. Further, fluorescent dyes with an emission in the red spectral region such as ADS055RE, ADS061 RE, ADS068RE, ADS069RE and ADS076RE commercially available from American Dye Sources Inc., Canada, may be used. Also these dyes may be used according to the present invention either individually or in the form of appropriate mixtures.

Alternatively as organic dyes, dyes emitting light developed for organic light emitting diodes (OLEDs) may also be used here. Dyes, as those described in Japanese patent JP 2795932 (B2), which are able to convert colours, may be used according to the present invention. The dyes described in a paper S. A. Swanson et al., Chem. Mater., Vol. 15, (2003) pp. 2305-2312 may also be used beneficially. Blue dyes, as well as green dyes, as well as red as described in Japanese patent applications JP 2004-263179 (A), JP 2006-269819 (A) and JP 2008-091282 (A) may also be used In particular, for red dyes, green light emitting dyes, which convert UV radiation or blue light, may be used in combination with dyes emitting red light, which absorb green light and emit red light as described in laid open Japanese patent application JP 2003-264081 (A). These dyes most generally may be used as they are described by the respective references. However, it may be necessary to slightly modify their chemical structures by well known measures, for example by the introduction of alkyl chains or the modification of alkyl chains, to increase their solubility in organic solvents, and especially in liquid crystals.

For blue inorganic phosphors, Cu activated zinc sulfide phosphors as described in laid open Japanese patent application JP 2002-62530 (A) and/or Eu activated halophosphate phosphors, Eu activated aluminate phosphors as described in laid open Japanese patent application JP 2006-299207 (A) may be used. For green inorganic phosphors, Ce or Tb activated rare earth element borate phosphors as described in laid open Japanese patent application JP 2006-299207 (A) may be used. For red emission, Eu activated lanthanum sulfide phosphors or Eu activated yttrium sulfide phosphors as described in laid open Japanese patent application JP 2006-299207 (A) may be used. Yellow phosphors which consist of BaS and $Cu^{2+}$ as a colour centre, as described in laid open Japanese patent application JP07-63365, and red phosphors which consist of $Ba_2ZnS_3$ and $Mn2+$ as a colour centre, as described in laid open Japanese patent application JP 2007-063366 (A), can also be used. Ce activated garnet phosphors, as described in Japanese patent JP 3503139 (B2) mentioned above, red phosphors, as described in laid open Japanese patent application JP 2005-048105 (A), beta-sialon green phosphors, as described in laid open Japanese patent application JP 2007-262417 (A), Ca alfa-sialon red phosphors can also be used. The phosphors above mentioned can be used as ground material and/or as surface modified material dispersed in light conversion layers. Quantum dots as described in WO 2006-017125 may also be used.

The light conversion means in the electro-optical switching elements according to the present invention increases the chromaticity range, improves the uniformity of the distribution of the light from the backlight and suppresses transmission of light having a the short wavelength and hence reduces or even prevents damage to the liquid crystal materials. The light conversion means used according to the present invention may have e.g. the form a single layer which includes one or a few kinds of organic dyes and/or inorganic phosphors or have the form of stacked layers including different dyes and/or inorganic phosphors in each layer. They further may be more or less continuous or spatially structures respectively patterned.

In order to obtain polarized light, light emitting substances having elongated shape, like dichroic dyes, are preferably used, which are aligned in a liquid crystal matrix. This orientation preferably is fixed by polymerisation of mesogenic compounds present in the liquid crystalline matrix or even making it up predominantly or even totally. Thus, the transition moment aligns along the preferred direction of the liquid crystal matrix. Dependent of the type of liquid crystal matrix used different types of polarization are achieved. A liquid crystal matrix aligned homogeneously and uniaxially leads to emission of linear polarized light, whereas a planar oriented cholesteric crystal matrix leads to emission of circular polarized light. However, in the case that the excitation light itself is polarized, also dyes without any dichroic behaviour may be used.

The electro-optical switching elements according to the present invention may beneficially comprise one or more optical compensation films, preferably one optical compensation film in order to compensate birefringence effects.

Additionally or alternatively the electro-optical switching elements according to the present invention may comprise an optical element placed between the light conversion means and the liquid crystal switching element at the side of the observer of the liquid crystal switching element. This optical element is an optical element capable to lead the light from the light conversion layer in a parallel or an almost parallel beam to each respective, corresponding sub-pixel of the liquid crystal switching element, either keeping the beam parallel or making it converge on the switchable liquid crystal layer. When the optical element keeps the light beam parallel, a light diffusing or a light expanding element may be placed at the side of the observer of the liquid crystal switching element to increase the field of view. Such a light diffusing or a light expanding element may be removable to control the possible angles of view of the LCD. Such an optical element, which leads the light from the light conversion layer to the liquid crystal switching element, either keeping the beam parallel or converging the beams, may be e.g. a micro-lens array as described in Japanese patent application JP 2008-097032 (A). Controlling the focal length of this optical element allows realization of a properly designed lens array. In this form of the present invention any parallax problems of the display are completely solves, which is particularly preferable for the bright LCD without colour filters.

In order to guide the light from the light conversion means efficiently to the liquid crystal switching layer, a reflection layer capable of reflecting the light from the light conversion means may be placed between the light conversion means and the backlight source. This reflection layer may be a cholesteric liquid crystal layer having region of wavelengths of selective reflection matching to the wavelength of the light from the light conversion means. This enhances the efficiency of the utilization of the light from the light conversion means.

It is also possible to place a light recycling optical element between the light conversion means and the backlight system. This light recycling optical element is tuned to the wavelength of the light from the backlight source and consequently enhances the intensity of the light from the backlight. This light recycling optical element may be a cholesteric liquid crystal layer whose chiral pitch is the same as the wavelength of the light from the backlight system and has the opposite twist sense against the light reflection means described in the former paragraph. This light recycling layer does not interfere with the reflection layer, since the wavelength regions differ from each other. This light recycling optical element can be alternatively a commercially available "BEF" (brightness enhancement film available from Sumitomo 3M Japan).

In a preferred embodiment of the present invention the matrix of the light conversion means is a cholesteric liquid crystal layer. In this case the light conversion means is capable to act as a means for emission of light and at the same time as a means for the reflection of ambient light layer. For example a cholesteric liquid crystal layer having a region of wavelengths of selective reflection matching a desired colour may be realized easily. A cholesteric liquid crystal layer reflects only circular polarized light having the same sense of rotation as twist of the cholesteric liquid crystal layer. For example by a right handed cholesteric helix only right handed circularly polarized light is reflected. Further, it is possible to incorporate one or more fluorescent and/or phosphorescent materials and/or phosphors having a peak of its wavelengths of emission in or close to the region of the wavelength of this selective reflection, in order to obtain an emission and a reflection from the light conversion means having the same or at least almost the same colour. Here, as described in the international patent application WO 2004/003108 and laid open Japanese patent application JP 2007-308418 (A), the chiral pitch of the cholesteric liquid crystal may be tuned to correspond to the optical distance of the fluorescent and/or phosphorescent material emission wavelength. Then the emission of right handed circular polarized light is enhanced by a cavity effect. In order to obtain the cavity effect the planar orientation and the morphology of the cholesteric liquid crystal materially has to be carefully controlled. This requires precise control of the cooling conditions and of the conditions of the alignment layer. The respective processes take comparatively long time and require fine control of the respective process conditions and parameters. In a specific embodiment of the present invention, it is not necessary to control the morphology very precisely, i.e. within small limits of variation, as to obtain the perfect cavity effect. On the contrary, from the point of view of the width of the possible observation angler realizable, it is desirable to disturb the morphology of cholesteric liquid crystal layer by tilting helical axes intentionally, as described in laid open Japanese patent application JP 2005-003823 (A).

Utilizing a cholesteric liquid crystal material as basis of the light conversion means layer leads to a high efficiency of the utilization of light, resulting in clear images even under bright ambient light conditions. This effect is even improved when a circular polarizer is placed between the light conversion means and the liquid crystal switching layer. The liquid crystal switching layer is sandwiched by two crossed linear polarizers and the circular polarizer may be obtained by adding a quarter wave plate to the linear polarizer. For example an R-circular polarizer, which transmits only the circular polarized light having right handed sense of rotation can be realized by placing a quarter wave plate having wide range of wavelengths to a linear polarizer so that its optical axis is twisted clockwise by 45° against the axis of transmission of polarizer. Then the wavelength of the light from the backlight system is converted through the light conversion means and passes through the circular polarizer. Subsequently only the circular polarized light having right handed sense of rotation is converted into linear polarized light, which passes into the liquid crystal switching layer. When the liquid crystal of the liquid crystal switching layer is in its optically "off" state, i.e. in the case of normally black mode no voltage (0 V) is applied to the liquid crystal layer, this incident light cannot pass through the polarizer at the observation side, and hence, black state is realized. Ambient light that passes through the polarizer at the observation side cannot pass through the circular polarizer, either, and the reflective mode is in its black state, too. On the other hand, when the liquid crystal layer is in its optically "on" state, that is, in the case of normally black mode a voltage significantly above the threshold voltage of the Fredericks transition is applied to the liquid crystal layer, the linear polarized light from the light conversion means, which reaches the liquid crystal switching layer, after having passing through the circular polarizer changes its state of polarization as it experiences the retardation of the liquid crystal layer. Then it can pass the polarizer at the observation side, and hence, a white, respectively bright, state is realized. The ambient light that passes through the polarizer at the observation side can pass both through the liquid crystal layer and the circular polarizer and reaches the light conversion means as the circular polarized light having right handed sense of rotation. This ambient light is reflected by the light conversion means, as the circular polarized light with right handed sense of rotation can pass through the circular polarizer and then passes through the liquid crystal layer and through the linear polarizer at the observation side similar to the light converted by the light conversion means. Therefore, in this embodiment of the present invention, ambient light can be utilized as well as the light from the backlight system, and hence, an LCD with high brightness and good visibility under bright ambient light conditions may be realized. These LCDs are particularly well suited for the outdoor use. The use of colour filters can be avoided. From the point of view of the brightness of the LCDs it is desirable to remove the colour filters, but for the expression of a wide region of colours and for the suppression of parallax errors it is often advantageous to use colour filters. Optimization of the colour filter properties for each application will result in best performance of the LCDs.

As will be described and illustrated in some detail in the example section of this application, light having a wavelength of less than 420 nm may be rather detrimental to liquid crystal materials, whereas light having a wavelength of 420 nm or more does lead to no severe damage on most liquid crystal materials and thus the resulting stability is acceptable for most practical applications. Therefore, from the point of view the long term reliability of LCDs it is important to decrease and even prevent the exposure of the liquid crystal layer to light with short wavelengths, in particular with wavelengths shorter than 420 nm.

Thus, according to the present invention a back light system, which is capable to emit essentially only light having a wavelength of 385 nm or more, preferably of 420 nm or more and most preferably of 435 nm or more is preferably used. To realize such a back light system a material absorbing UV radiation or even blue light with a short wavelength, preferably in the form of a layer e.g. a UV cut-off filter, may be placed between the light source of the backlight and the liquid crystal switching layer. Alternatively an LED emitting light with appropriate longer wavelengths, e.g. a blue LED may be used as the light source.

So far there are only a few systematic investigation on the phenomena of the degradation of LCDs under exposure to electromagnetic radiation. The characteristics of the degradation of light diffusion plates made from polycarbonate by irradiation with UV is shown in "LCD Backlighting Technologies", CMC Publishing (2006), pp. 155-157. Such light diffusion plates made from polycarbonate are frequently used in backlight systems of LCDs, in particular, for large liquid crystal TV sets. According to the results of the publication, the polycarbonate does not degrade by exposure UV radiation having a wavelength of 365 nm, but does significantly degrade by exposure to UV radiation having a wavelength 313 nm. It is concluded there, that completely prevented of exposure to UV radiation having a wavelength of 313 nm UV the degradation of the polymer materials in LCDs will be suppressed significantly.

In the following several preferred embodiments of the present invention will be explained in some detail referring to representative figures. In these figures liquid crystal cells are shown, which here typically comprise three liquid crystal switching elements, one each for each primary colour (R, G, B). These multitudes of switching elements may constitute a display or rather a part thereof. Repeated sets of such switching elements in form of a mosaic, e.g. in a striped arrangement or in a triangular arrangement allow realization of an image display. However, also other separations into colours are possible. Obviously, two sub-pixels with different colours may be used for displays with a reduced range of colour reproduction and even a single pixel would be sufficient for displays displaying a single colour only, e.g. for black on white images, which may have grey scale capability.

This array of liquid crystal display switching elements may further comprise electric switching elements, such as thin film transistors, which are not shown. In case the liquid switching elements have an electrode, respectively electrodes, at the side opposite to the backlight system, these are transparent electrodes. And in case they also have an electrode, respectively electrodes, at the side facing the backlight system, these are preferably transparent, too. This array of liquid crystal display switching elements may further also comprise one or more optical compensation films, if necessary. These conditions apply generally to all embodiments of the present invention.

In the figures generally arrays of three liquid crystal display switching elements, one each for the three primary colours blue, green and red are shown. The liquid crystal cells are represented only schematically by the pair of polarizers on the top and the bottom and the liquid crystal material in the middle. The colour filter, if any, is indicated by respective three parts on the top of the cell adjacent to the top polarizer. The substrates including the electrodes and orientation layers are not shown for simplicity.

In the figures the optical path of the respective light is indicated by arrows. The state of the polarization of the respective light is indicated by the conventional symbols. For linear polarization an arrow with two points (↔) is used for light polarised in the plane, with the orientation of the arrow in the plane indicating the direction of the polarization and a crossed circle (⊗) or a circle with a dot in its centre (⊙) for polarization perpendicular to the plane, whereas for circular polarized light an open circle with an arrow point and the appropriate twisting sense is used, i.e. "↻" for right handed (clockwise) twisting sense and "↺" for left handed (counter clockwise) twisting sense assuming the light passes from front of the paper plane to the back of the paper plane.

The first main embodiment of the present invention is illustrated in FIG. 1. This figure shows an array of three liquid crystal display switching elements, one each for the three primary colours blue, green and red. The liquid crystal cell is represented schematically only, as mentioned above, by the pair of polarizers on its top and bottom and the liquid crystal material in the middle. The colour filter is indicated by the respective three parts on the top of the cell adjacent to the top polarizer. The substrates including the electrodes and orientation layers are not shown here for simplicity. The array of the three liquid crystal switching elements comprises a back light system, which is able to emit essentially only light having a wavelength above a lower limit, i.e. of 385 nm or more, preferably of 420 nm or more and most preferably of 435 nm or more. This may be achieved by the use of an UV absorbing substance placed between a conventional backlight, such as a cold cathode fluorescence lamp (CCFL), and the liquid crystal switching layer or by the use of an LED emitting at longer wavelengths, e.g. a blue LED. The array of liquid crystal switching elements further comprises a light conversion means, which converts light from a backlight system into linearly polarized light and at the same time shifts the wavelength of the light from the backlight to visible light. In the embodiment illustrated here the light conversion means comprises three sub-layers consisting of uniaxially oriented polymeric substance each comprising one or more dichroic fluorescent or phosphorescent dyes. Each layer comprises one or more dichroic fluorescent or phosphorescent dyes having an emission at a wavelength matching that of the corresponding respective part of the colour filter. In the embodiment illustrated in this figure the wavelength of the light from the backlight is shifted by one each of the respective layers of the light conversion means to one each of the three primary colours: blue, green and red. Alternatively, the light conversion means may have the form of a single layer including one or several kinds of organic dyes and/or inorganic phosphors.

The light conversion means in this embodiment increases the chromaticity range, improves the uniformity of the distribution of the light from the backlight and suppresses transmission of light having a the short wavelength and hence reduces or even prevents damage to the liquid crystal materials.

The emission of light from the light conversion means as linear polarized light enhances the efficiency of the utilization of the light of the light switching elements. In case the degree of polarization of the light emitted from the light conversion means is already sufficiently large, the entrance polarizer of the liquid crystal switching elements facing the light conversion means may not be required and can be omitted.

Figure 2:
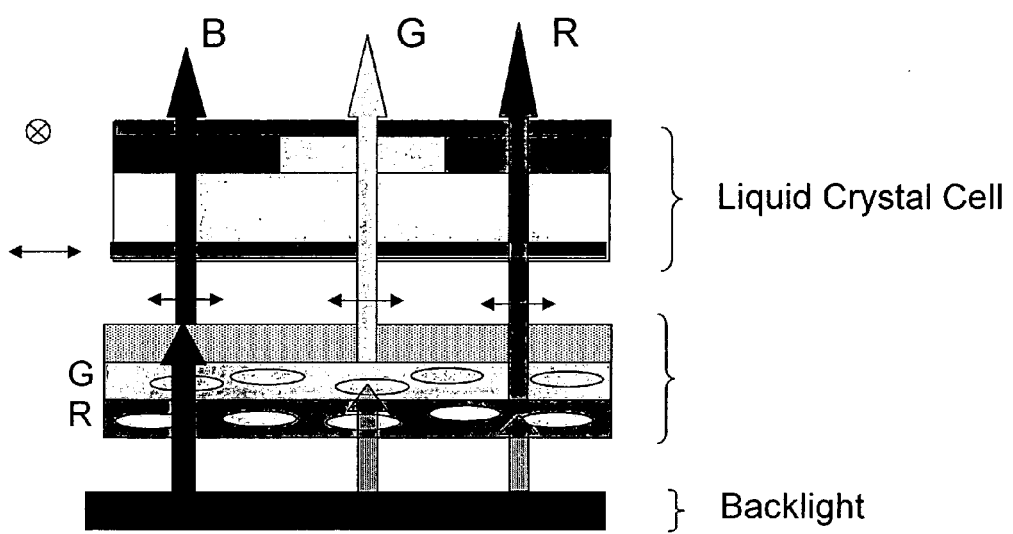

A first modification of the first main embodiment of the present invention, shown in FIG. 1 above, is illustrated in the following figure, FIG. 2. Here, the light conversion means differs from the one used in the previous figure in the following way. While the sub-layers for green and red light comprise their respective light emitting moieties (fluorescent respectively phosphorescent materials), as disclosed above, and, thus, both simultaneously convert the state of polarization and the wavelength of the light from the backlight; now, the sub-layer for blue light does not comprise any light emitting moieties which interact with blue light and, consequently does not shift the wavelength of the respective light from the back light. It only changes the state of polarization of the blue light closer to linear polarization. Consequently, the respective blue spectral part of light of the backlight, which is used without any shift in its wavelength, has to be selected appropriately for the desired colour space to be presented. LEDs emitting in the respective spectral range are used preferably here.

Figure 3:
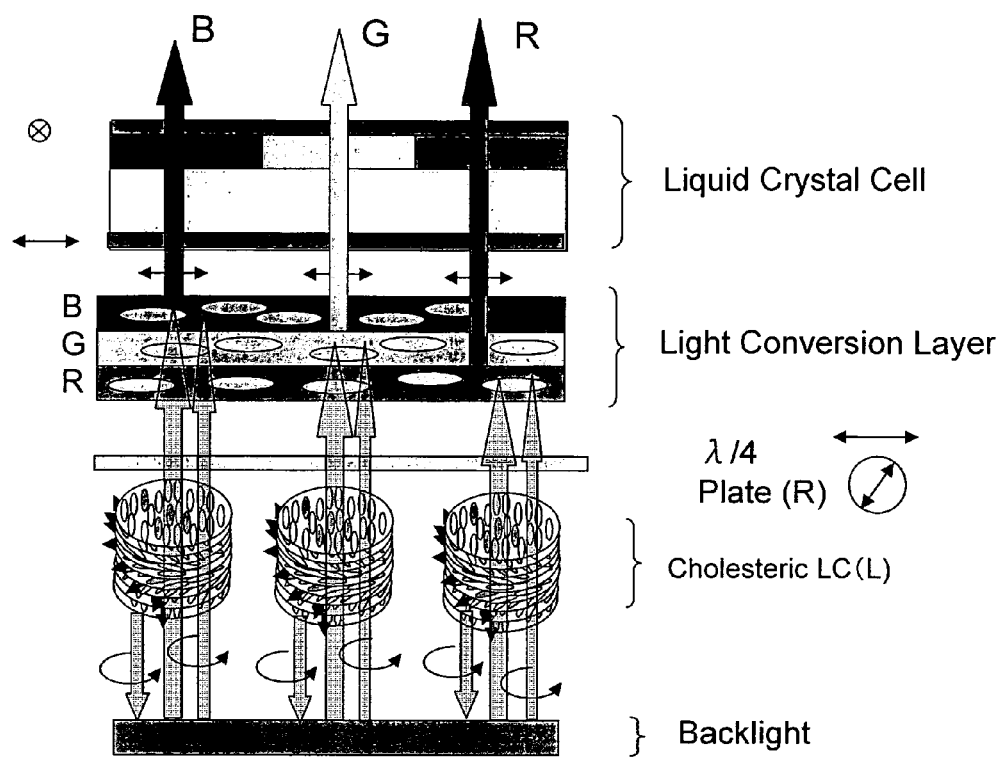

A second modification of the first main embodiment of the present invention, shown in FIG. 1, is illustrated in the next figure, FIG. 3. Here, the embodiment of FIG. 1 is augmented by the introduction of a structure capable of enhancing the use of the light from the backlight, which is also called a light recycling optical element. This structure is preferably introduced between the light conversion means and the backlight system as shown in FIG. 3. This additional structure preferably comprises or consists of a layer of a cholesteric liquid crystal of appropriate cholesteric pitch corresponding to the wavelength of the radiation emitted by the backlight. E.g. for excitation with blue light the range of wavelengths of selective reflection is set to (470±20) nm and for excitation with violet light it is set to (400±20) nm. Preferably this structure is capable of enhancing the use of the light from the backlight. It preferably is further comprising and a quarter wave plate, preferably facing the light conversion layer. In this figure a left handed cholesteric helix is illustrated exemplarily, which means that the director of the liquid crystal is twisted counter clockwise in successive layers, respectively levels. The light having the same twisting sense as the cholesteric helix (i.e. left handed) is reflected, whereas the light with the opposite twisting sense passes through the cholesteric helix. Subsequently to its transmittance through the cholesteric helix this light is reflected again by the backlight system. By this reflection the handedness of that part of the light is inversed, so that it now can pass the cholesteric layer. In effect, the light thus is exploited to a higher degree. As one half of the light having the wrong twisting sense, i.e. in the case illustrated here the left handed one, would be absorbed by the polarizer, the conversion of the handedness of this part of the light theoretically could lead to a doubling if the exploitation of the use of the light form 50% to 100%. In most practical cases an increase to 70% can be achieved. Since the light used as light for excitation does not need to be completely polarized light, the linear polarizer may be omitted here in many cases. Alternatively the commercially available "BEF" (brightness enhancement film) (*17) may be used as a light recycling optical element, in order to convert the light from the backlight into linearly polarized light efficiently here, too.

The light recycling optical element may alternatively be placed between light conversion means and liquid crystal switching layer in which case the pitch of the cholesteric liquid crystal covers the visible regions. In case it is inserted between the light conversion layer and the liquid crystal switching layer, the pitch values of the cholesteric liquid crystals are matched to the three primary colours (R, G, B). Whereas, in case it is inserted between the light conversion means and the backlight, the pitch of the cholesteric liquid crystal preferably is matched to the wavelength, respectively the spectrum of the backlight.

In some cases, the efficiency of the utilization of light is higher when circular polarized light is used compared to the case that linear polarised light is used, for example, VA mode because the light transmittance does not depend on the azimuthal angle director orientation and practical aperture ratio increases. In these cases the circular polarized light may be used directly and, any way, also linear polarized light can be easily converted into circularly polarized light by using a quarter wave plate. This effect is common for every embodiment in the present invention.

Figure 4:
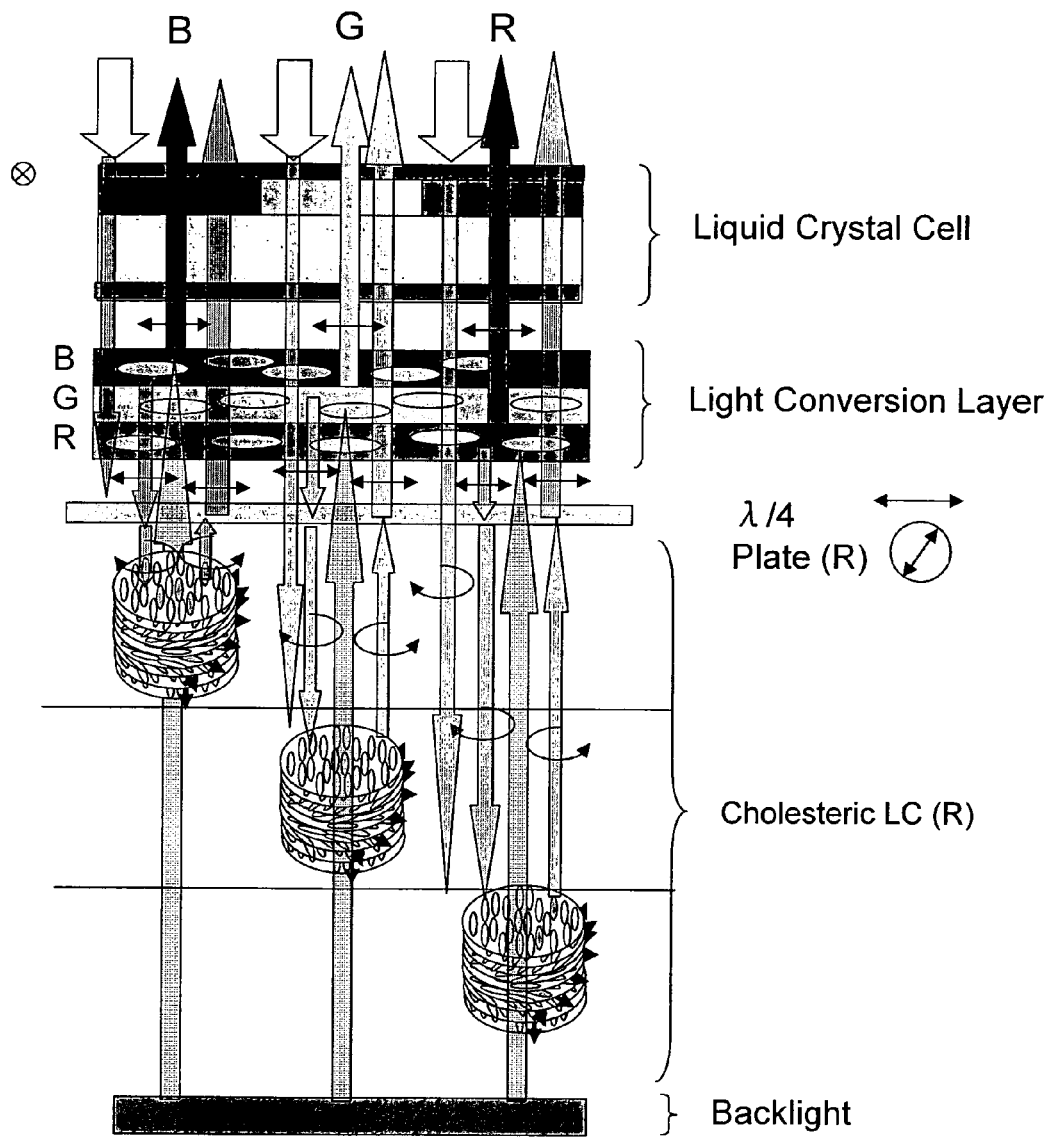

A further modification of the first main embodiment of the present invention is shown in FIG. 4. Here, in contrast to the modification shown in FIG. 3, instead of the structure capable of enhancing the use of the light from the backlight a different structure is used. This different structure is capable of reflecting ambient light and light emitted from the light conversion means in the respective direction. Here, three different cholesteric layers, each having a different, pre-defined cholesteric pitch are used stacked one on top of another preferably in combination with a quarter wave plate. The cholesteric pitch of the different layers is selected so that one each of them has a wavelength of selective reflection in the range of one of the primary colours (R, G, B), preferably matched to the transmission spectrum of the respective part of the colour filter having the same colour. These cholesteric layers reflect light having the same twisting sense as their helix (shown as right handed here), and the reflected light is utilized again for the display of an image. Therefore, the structure can utilize both the light emitted and the ambient light at the same time. Moreover, the light emitted is used more efficiently because the light which otherwise would not contribute to the display image without the reflection layer, as it is emitted into the wrong direction, i.e. towards the backlight system, is utilized here, too.

Figure 5:
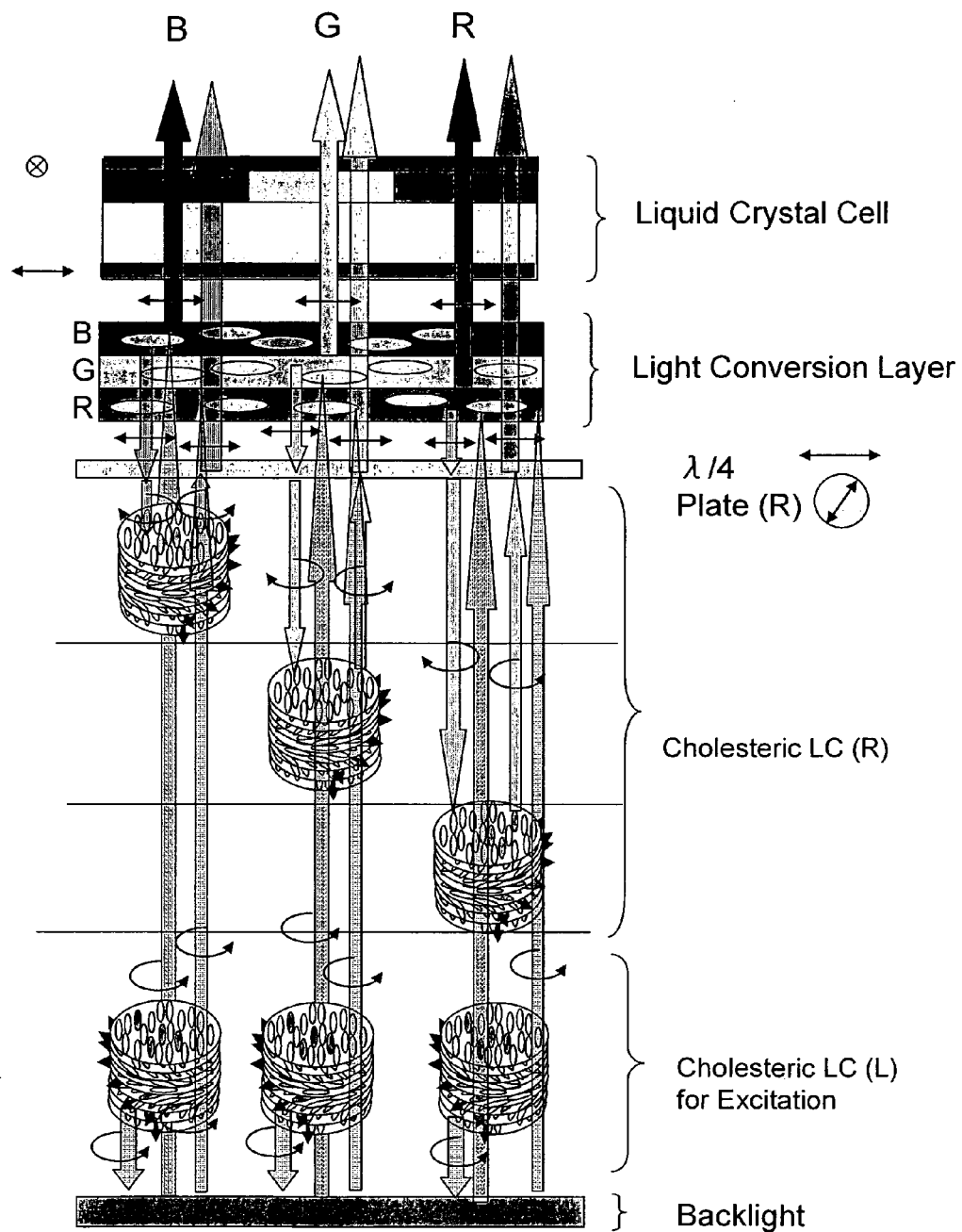

In still a further variation of the first main embodiment of the present invention, which is shown in FIG. 5, both the structure capable of enhancing the use of the light from the backlight of FIG. 3 and the structure capable of reflecting ambient light of FIG. 4 are used simultaneously.

Figure 6:
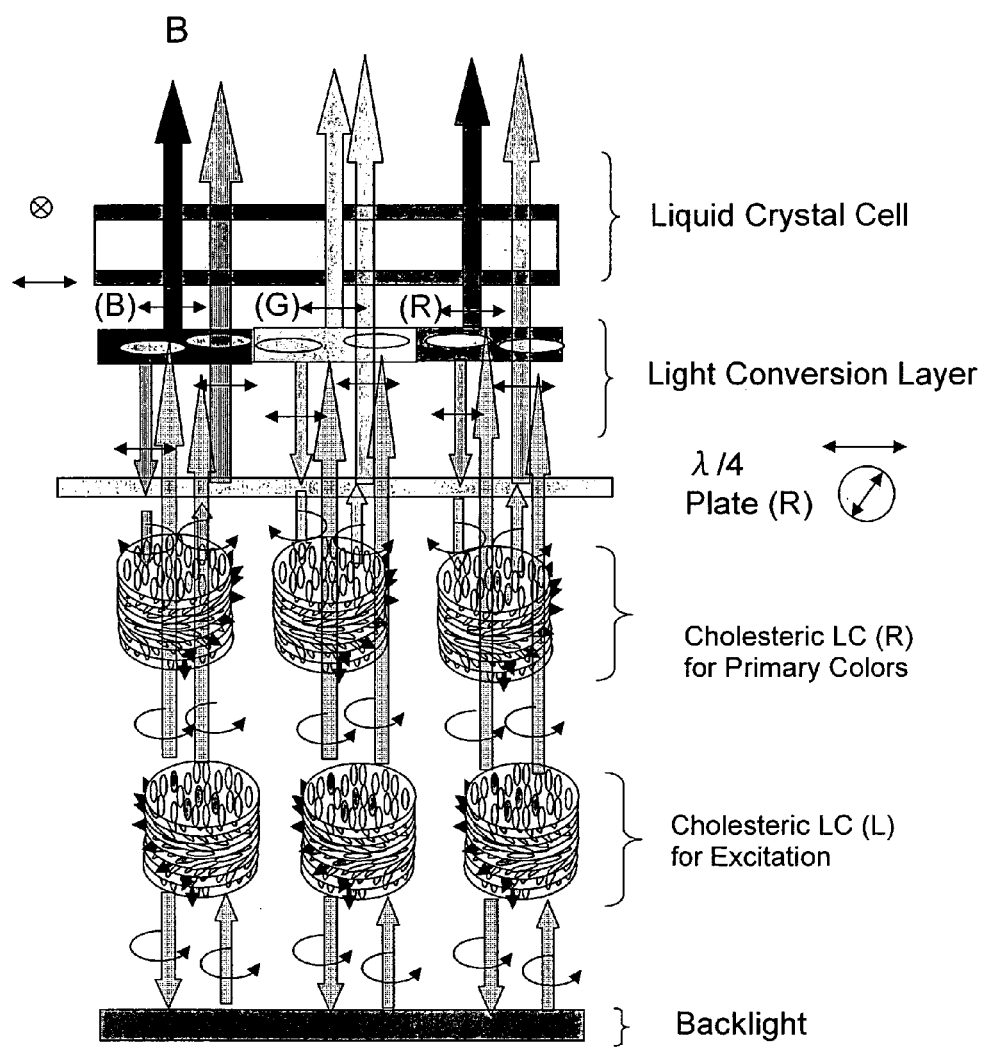

The second main embodiment of the present invention allows realizing colour displays eliminating the need to use a colour filter. This embodiment is shown in FIG. 6. Like the previous embodiments, the light conversion means also in this embodiment comprise linearly oriented liquid crystals comprising one or more linearly oriented dichroic fluorescent or phosphorescent dyes and/or phosphors leading to the light becoming closer to linearly polarised after traversing light conversion means. Now, however, the light modification means are of a different form. They are structured spatially, respectively spatially patterned, with respect to their colours and are arranged in a plane or essentially in a plane. Each one of these areas having a certain colour is corresponding to the sub-pixel for that respective colour. This is achieved by the use of different dichroic fluorescent or phosphorescent dyes and/or phosphors with respective colours in the different parts of the light conversion means. It is possible to use a colour filter also in this embodiment of the present invention. In this case the areas of the colour filter are aligned in relation to those of the light conversion means having the same colour. In this case, a parallax problem, which may occur in case the respective areas are not sufficiently well aligned with respect to each other, will be diminished.

Figure 7:
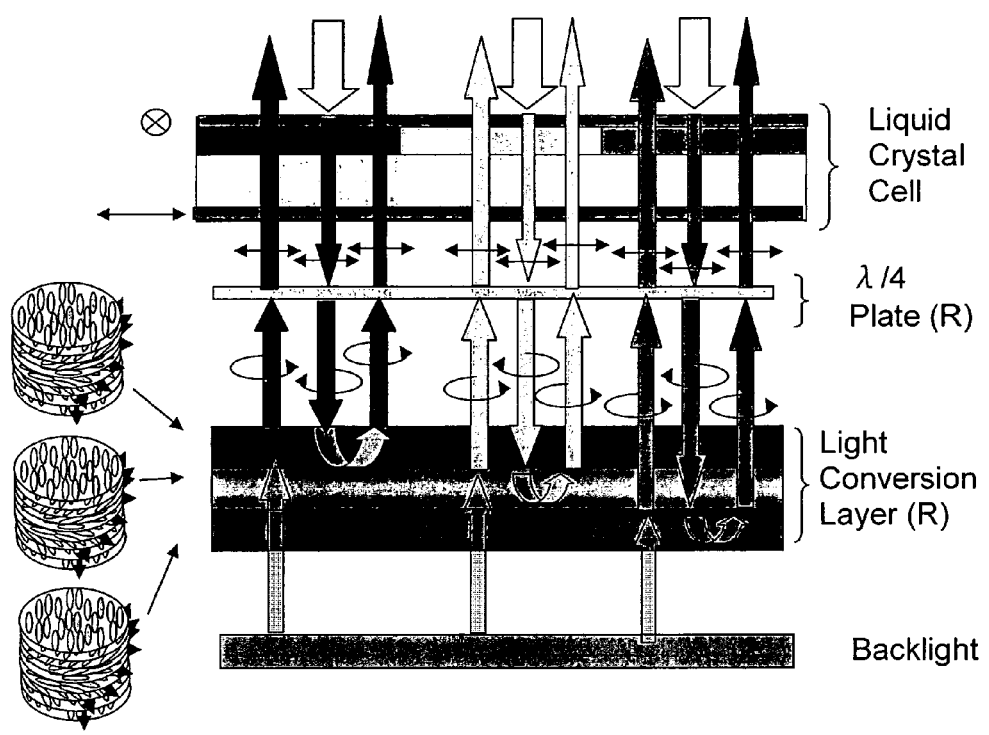

The third main embodiment of the instant invention is illustrated in FIG. 7. This embodiment uses colour filters in the electro-optical switching elements and the light conversion means comprises layers of cholesteric liquid crystals. One layer each has an appropriate cholesteric pitch selected in such a manner that its range of selective reflection is matching the spectral range of transmission of the respective corresponding part of the colour filter having the same colour and at the same time each layer comprises one or more dichroic fluorescent or phosphorescent dyes and/or phosphors having the appropriate wavelength. Thus the light from the backlight system is converted into circularly polarized light by the respective layers of the light conversion means. This circular polarization may then be transformed into linear polarization in the usual way, i.e. by means of a quarter wave plate, as illustrated in FIG. 7. It is also possible to operate the liquid crystal cell using this circular polarized light directly, as proposed in some references. In case the chiral pitch is selected to match the wavelength of the light emitted and at the same time a perfectly uniform or nearly perfectly uniform morphology is realized a cavity effect occurs. However, it is preferable from the point of view of a broad viewing angle, to disturb the helical axis at least to some degree, so that no clear cavity effect is observed. And further, besides the conversion of the colour and of the state of polarization of the light from the backlight system the light conversion means of this embodiment also leads to a reflection of ambient light, as illustrated in FIG. 7, too. Here it has to be noticed, that the light of the appropriate colour, which passes the respective part of the colour filter, after traversal of the liquid crystal switching layer is subsequently transformed into circular polarized light by the quarter wave plate and then reflected by the respective part, i.e. layer, of the light conversion means. This does significantly enhance contrast and readability under bright ambient lighting conditions.

Figure 8:
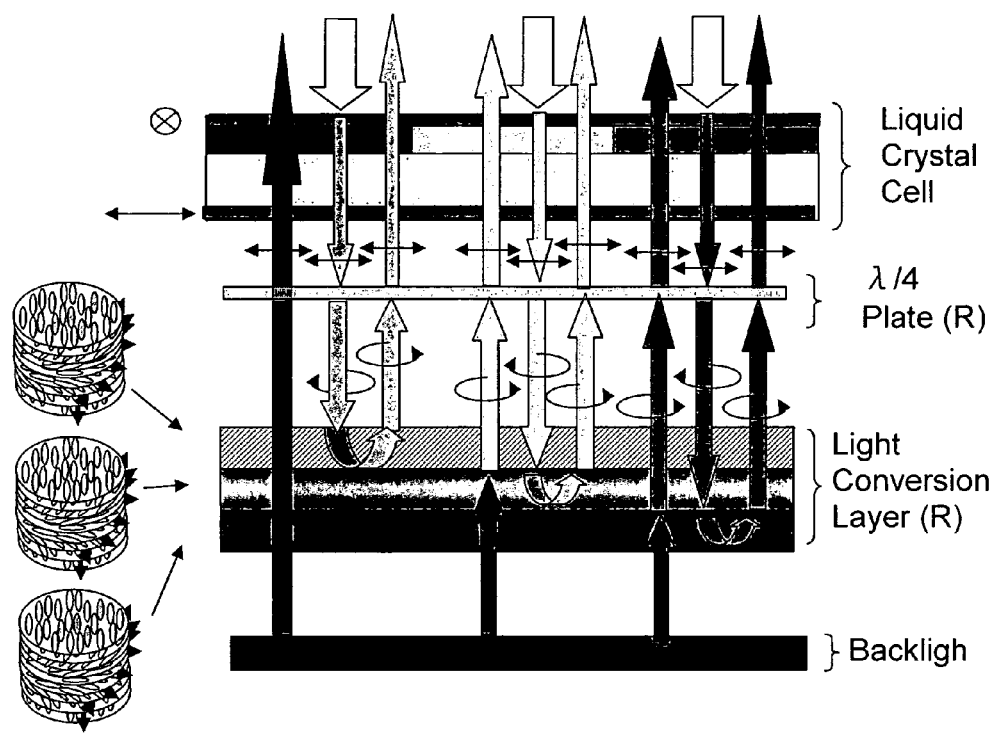

Similar to the first modification of the first main embodiment of the instant invention also a first modification of the third main embodiment exists. This is shown in FIG. 8. Like first modification of the first main embodiment of the instant invention also here, in the first modification of the third main embodiment also here the layer of the light conversion means for blue light, does not comprise any dichroic fluorescent or phosphorescent dyes and/or phosphors, which interact with blue light and thus does not shift the colour of the light from the backlight system having the respective colour, i.e. being blue. In contrast, again here only the polarization state of the blue light from the backlight is changed. In this case the chiral pitch of the cholesteric liquid crystal is not matched to the wavelength of blue light but usually is shifted to shorter wavelengths. Thus, the blue light from the backlight system, as well as ambient blue light passes through to the observer. The blue colour of the backlight system is shifted to green, respectively to red, by the corresponding parts, i.e. layers, of the light conversion means, and their polarization states are also changed to circular polarization. At the same time, as in the third main embodiment of the instant invention shown in FIG. 7, ambient light is reflected by the light conversion layer, consequently enhancing readability under bright ambient lighting conditions. Although, in this case the wavelengths of the blue light, which is transmitted and of the blue light, which is reflected are slightly different, there is no major problem for practical applications. And, in the case a colour filter is used, there is no problem at all in this respect.

Figure 9:
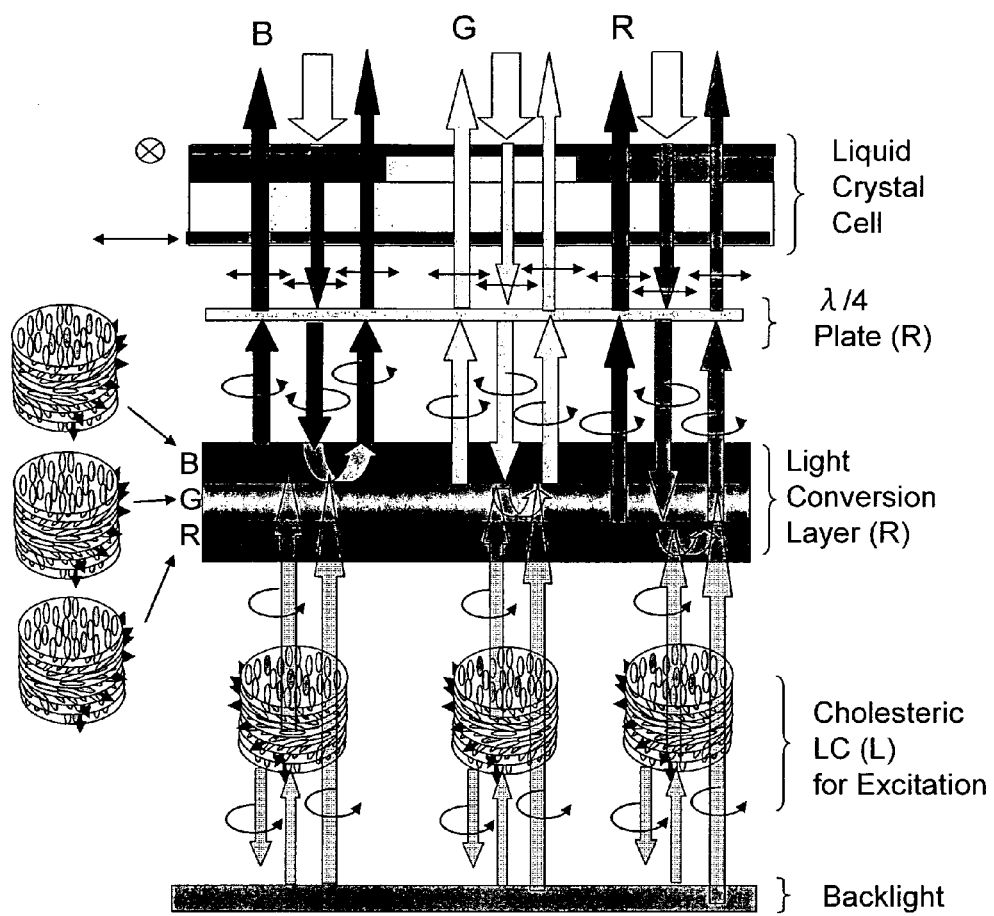

FIG. 9 shows a second modification of the third preferred embodiment of the instant invention. Here like in the second modification of the first main embodiment of the present invention shown in FIG. 3 again a cholesteric light enhancer for the backlight for the excitation is used.

Figure 10:
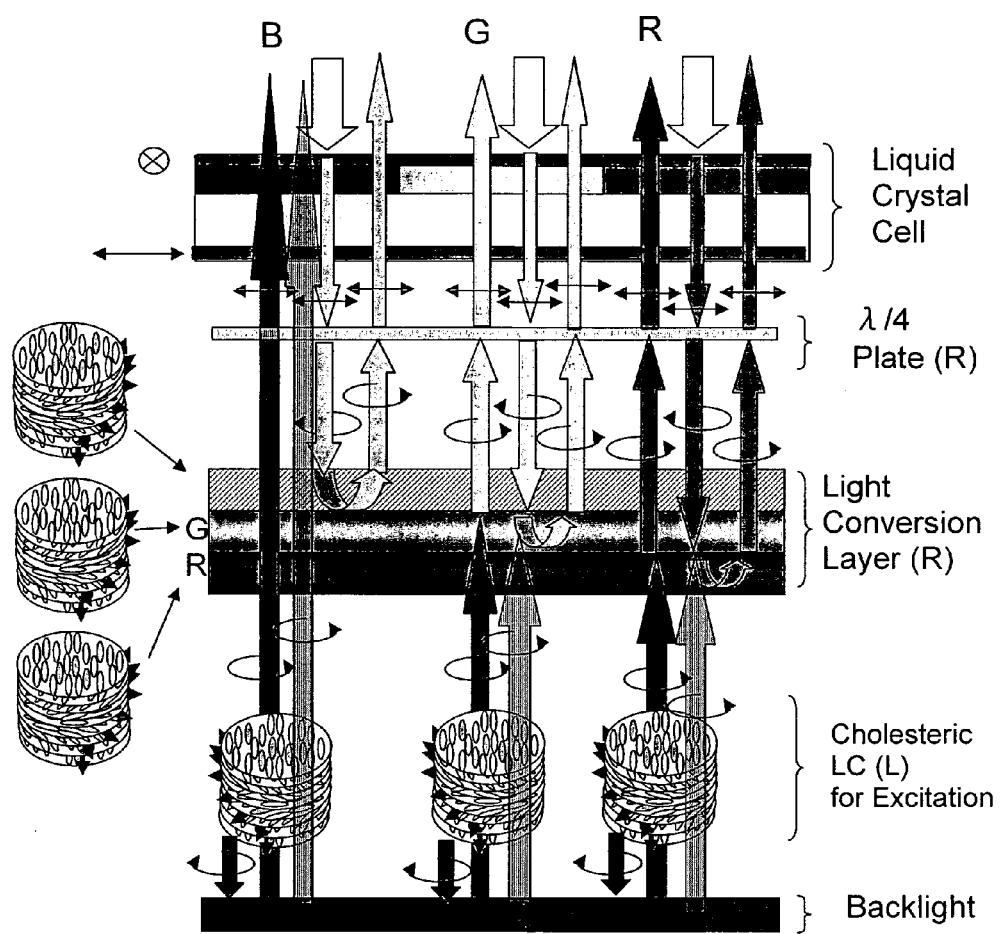

FIG. 10 shows a further modification of the previously illustrated modification of the third main embodiment of the instant invention. In this modification, like in the embodiments shown in FIGS. 2 and 8 the respective part, i.e. layer, of the layered light conversion means does not comprise any dichroic fluorescent or phosphorescent dyes and/or phosphors which interact with blue light. Thus, here again the colour of the blue light from the backlight system is not changed but only its state of polarization is converted.

Figure 11:
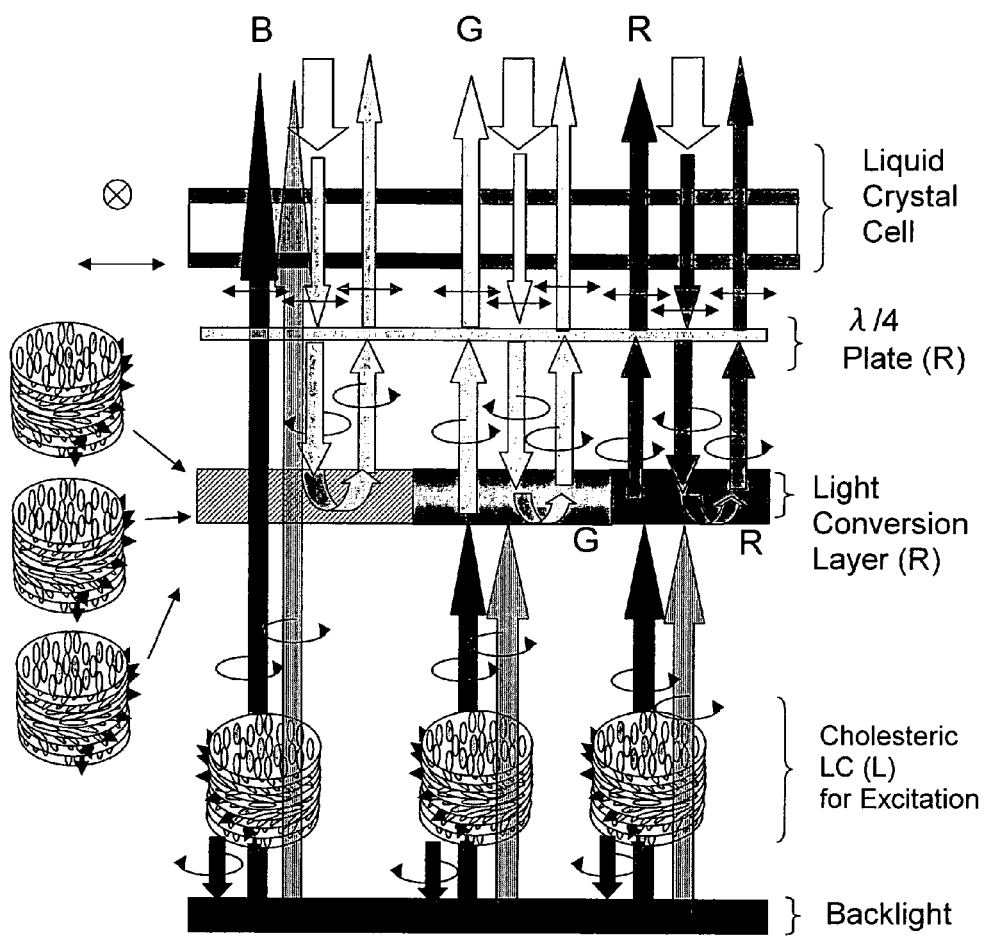

FIG. 11 represents a fourth main embodiment of the instant invention. This embodiment is particularly preferred. Here, like in the third preferred embodiment the light conversion means comprise, respectively consist of cholesteric liquid crystal material. At the same time, the array of light modulation elements does not need to comprise a colour filter while the light conversion means is spatially structured, respectively patterned, as in the second main embodiment of the present invention. In this present embodiment, i.e. the fourth main embodiment, the area of the light conversion means responsible for the blue light may comprise a respective dye. Such a dye, however may also be absent, as depicted in FIG. 11. In this case the colour of the blue light from the backlight system is not changed. And the light from the backlight for excitation is enhanced by the light enhancement, comprising a cholesteric liquid crystal layer having a pitch matched to the wavelength of the backlight for excitation, and having the opposite twisting sense of that of the light conversion means.

The mechanism of the emission of light of the cholesteric liquid crystal layer can be any type of the light-emitting mechanism, for example, fluorescence or phosphorescence by short wavelength light excitation or light emission by recombination of the hole and electron injected through electrodes.

It is also possible, to place an optical element comprising a polarizer sandwiched by two wide wavelength-range quarter-wave plates between the cholesteric liquid crystal layer and the optical element suppressing selective reflection to obtain completely circular polarized light from the cholesteric liquid crystal layer. This optical element can be either a half mirror or a linear polarizer at least one side of which is covered with a quarter-wave plate, besides a linear polarizer sandwiched by two wide wavelength-range quarter-wave plates.

In order to achieve a high contrast ratio, ambient excitation light is eliminated preferably outside of the cholesteric liquid crystals layer. For this, preferably at least one side of the cholesteric liquid crystal comprising at least one light-emitting moiety is covered directly or indirectly with a layer absorbing light having wavelength of 400 nm or less, preferably of 470 nm or less. In this context "indirectly covered" means that the respective layers are present besides one another. I.e. said light absorbing layer is present separately from the cholesteric liquid crystals layer, for example as an over-coat layer or as a transparent substrate present between the cholesteric liquid crystals layer and the light absorbing layer. This embodiment is particularly useful for displays having a light-emitting cholesteric liquid crystal layer of the in-cell type. In this embodiment in some cases no colour filter is required. The exiting light from the outside of the cell, e.g. from a LED, an OLED or a fluorescent lamp, enters the cell from one side, traverses the cholesteric liquid crystal layer, which converts it to circular polarized light, and then passes a layer absorbing ambient light before entering the switchable liquid crystal layer.

In a preferred embodiment of the present invention the electro-optical switching element comprises two or more means, preferably three means for emission of light, one each for emission of light of one of three different wavelengths, preferably of primary colours, e.g. red, green and blue, preferably one each of said three means forming one of three layers, preferably stacked one on top of the other, preferably in the sequence of blue, green and red seen from the observation side.

In a further preferred embodiment of the present invention the electro-optical switching element comprises a means for emission of light having three different areas, each one with a different emitter, one each for the emission of light of one of three different wavelengths, preferably of primary colours, e.g. red, green and blue, each of the three areas preferably having a surface of 90.000 $\mu m^2$ or less, preferably having a diagonal of 450 $\mu m$ or less, preferably of 300 $\mu m$ or less and most preferably of 200 $\mu m$ or less.

If the light-scattering film used in any of the embodiments of the present invention comprises a polymer dispersed liquid crystal (PDLC) device, the viewing angle characteristic change can be switched electrically.

Electro-optical displays comprising electro-optical switching elements according to the present invention may beneficially comprise one or more arrays of micro-lenses. Such micro-lens arrays are generally known in the art. These micro-lens arrays may be prepared by usual techniques such as structured etching of suitable substrates, printing, embossing, stamping, engraving, ablation (e.g. laser ablation), photolithography of suitable materials, e.g. of polymers having appropriate refractive indices or moulding, preferably by moulding.

For the electro-optical displays according to the present invention it may be desirable to use a micro-lens array on the side of the display facing the observer. Preferably one lens each is associated to each pixel, respectively sub-pixel, of the display. Preferably the micro-lenses have an areal extension, which is similar to that of their corresponding pixel of the display. Preferably both the pixel array and the micro-lens array have the same pitch, preferably in both dimensions of the area of the display. The size of the micro-lenses preferable is smaller than that of their corresponding pixels, which helps reducing or even avoiding problems of the alignment of the lenses relative to their corresponding pixels.

As first type of micro-lens array preferably consist of concave micro-lenses, i.e. of lenses having a lower thickness in their middle compared to their edges. Most preferably they are plane-concave lenses, i.e. preferably they have only one curved major surface. Typically the bottom of these micro-lenses, facing the display, is flat. This type of lenses is able to collect the ambient light to the light conversion layer from a larger range of angles and likewise expands the light reflected to the same larger range of angles. Micro-lenses made from polymethylmethacrylate (PMMA), which has a refractive index of 1.49, are able to collect ambient light to the light conversion layer from angles raging over +/−45.3° and likewise to expand the light reflected to a range of angle ranging over +/−45.3°.

Additionally or alternatively to the micro-lens arrays mentioned above, the electro-optical displays according to the present application may comprise one or more, preferably two, micro-lens arrays between the switching liquid crystal layer (e.g. the LC cell) and the light conversion means. In this embodiment preferably two micro-lenses each are associated to each pixel, respectively each sub-pixel, of the display. Preferably these micro-lenses are convex lenses, i.e. having a higher thickness in their middle compared to their edges. Most preferably they are plane-convex lenses, i.e. preferably they have only one curved major surface. More preferably the convex side of these micro-lenses has a semi-spherical shape or the shape of a section of a sphere, which preferably is less than a semi-sphere. Again, the lenses of these arrays have an areal extension, which is similar to that of their corresponding pixel of the display. Preferably both the pixel array and the micro-lens array, respectively the micro-lens arrays, as the case may be, have the same pitch, preferably in both dimensions of the area of the display. The size of the micro-lenses of these arrays preferable is smaller than that of their corresponding pixels, which helps reducing or even avoiding problems of the alignment of the lenses relative to their corresponding pixels. Preferably two each of these convex micro-lenses of these two arrays correspond to the same pixel, respectively sub-pixel. The two convex micro-lenses forming such a pair are preferably located in either one of two different layers on top of each other, their convex surfaces pointing inward, i.e. facing one another. This type of micro-lens array, consisting of pairs of convex micro-lenses, mutually corresponding to one another, is able to convert the light coming from the light conversion layer into light being emitted over a very small range of angles, in fact, the light emitted being lead to become almost parallel. Thus the two arrays of micro-lenses supplementing each other effectively act like an array of light collimators, one each for each pixel of the display.

The two arrays of micro-lenses can be placed apart from each other by suitable spacers, so that their focal points coincide with the respective light conversion layer for each colour. This embodiment, in which pairs of micro-lenses, one each of each one of the two arrays of micro-lenses with a convex shape, are facing each other so that their focal points almost coincident, is preferred, as it is highly effective for both light emitted and for light reflecting from the light conversion layer.

In some electro-optical displays problems of the alignment of the position of their different pixellated constituents relative to each other under varying temperature may be encountered due to the difference or differences between the coefficients of thermal expansion of the different materials e.g. (in particular that of the glass substrate and/or that of the polarizer and/or that of the pixels of light conversion layer).

This effect may be reduced or even avoided more or less completely by realizing the layered stack of the light conversion layer and the polarizer in such a way that they are divided into separate parts at least at one of the boundaries of the pixels and preferably at all boundaries of the pixels. The total length of thermal expansion being proportional to the original length of the respective parts, the thermal shift becomes negligible if the original length of the respective individual parts is in the range of the size of the pixels, i.e. some μm.

Here, the polarizer and a quarter wave plate can be replaced with a broad band cholesteric liquid crystal layer having the handedness opposite to that of the light conversion layer. Instead of a conventional circular polarizer, which typically is made of PVA doped with polyiodine and a quarter wave plate, cholesteric liquid crystal layers having a large bandwidth and having the with twist sense opposite to that of the light conversion layer, may be used as a polarizer. They allow circular polarized light with the same twist sense as the light conversion layer to pass. The broad band cholesteric liquid crystal layer can be easily prepared using photolithography and/or ink-jet printing.

Another possible means to reduce the undesired effect of the different thermal expansion of the substrate and of the polarizer and/or light conversion layer and/or combination consisting of polarizer and light conversion layer is to sandwich the latter between two substrates that have the same or almost the same thermal expansion coefficients to each other. The polarizer may then be laminated or sticked or glued to one of these two substrates.

In the case that the light conversion layer is realized inside of the display cell no problems with parallax occur and any problems resulting from the different thermal expansion of the substrate and the polarizer/light conversion layer are avoided even without the necessity of using a micro-lens array or the use of polarizer/light conversion layer, which are separated between adjacent pixels.

In a special preferred embodiment of the present invention the LCD mode applied for the liquid crystal switching layer is the guest-host mode. Here any known type of LCD mode using a liquid crystal doped with a dichroic dye may be applied.

Particularly preferred are those display modes using liquid crystal mixtures with negative dielectric anisotropy, which are also used e.g. in displays operating in VA mode, albeit mostly without dicroic dyes there. The guest host mode here may be beneficially realised by introduction of one or more "positive" dichroic dyes, which are defined as those dyes having a larger transmission (whose transition moment is) viewed parallel to their long molecular axis than perpendicular to their long molecular axis.

Alternatively to the "positive" dicroic dyes, mentioned in the embodiment directly above, "negative" dichroic dyes, whose transmission (transition moment) is a larger viewed perpendicular to their long molecular axis than viewed parallel to their long molecular axis, may be incorporated into the liquid crystal mixtures used for the liquid crystal switching layer. In this GH mode an operation in a normally black mode is obtained. The normally black mode is the preferred mode of operation for several applications, as it requires a less stringent control of the cell gap for different colours to obtain a good black state.

A good contrast can be achieved in these latter two GH modes by the use of a circular polarizer, which preferably consists of a linear polarizer and a quarter wave plate with a broad wavelength range.

The liquid crystal mixtures comprising the dichroic dye or dyes are vertically aligned in the liquid crystal cell when no electric voltage is applied. The liquid crystal layer is thus transparent and both the light emitted and the light reflected light from the light conversion layer can be seen for this pixel.

When a sufficiently high voltage is applied to the liquid crystal switching layer, the LC molecules tend to align parallel to the substrate and both the light emitted and the ambient light are absorbed by the dichroic dye.

It is desirable that both kinds of twist states occur to cover all the directions of azimuthal angle, i.e. that a degenerated twisted state is realized. Without using any protrusion on the substrate or substrates and without treating of the surface of the substrate or the surfaces of the substrates e.g. by rubbing, the LC comprising no chiral dopant automatically aligns parallel to the substrate surface with small regions different in twist sense.

The retardation of the liquid crystal layer preferably is set to an integer multiple of half the wavelength of the colour of the respective pixel. Then, the liquid crystal transforms right-handed circular polarized light into left-handed circular polarized light and vice versa. It has to be noted that here a positive dichroic dye is used. The circular polarizer, placed at the side of the observer, then transmits circular polarized light of the same handedness as that of the cholesteric liquid crystal layer. When no voltage is applied, both the light emitted and the reflected ambient light pass through liquid crystal layer and the pixel is in its bright state (normally white mode). When a sufficiently high voltage is applied, the LC molecules tend to align parallel to the substrate and both the light emitted and the ambient light are absorbed by the dichroic dye.

Moreover, in case e.g. the circular polarizer, designed by combining a linear polarizer and a quarter wave plate so that their optical axes form an angle of 45°, on the side of observation is set so that only right handed circular polarized light does enter the LC cell. Then the part of the ambient light having right-handed circular polarization reaches the cholesteric liquid crystal layer as left handed circular polarized light, which is no more reflected by the cholesteric liquid crystal layer. The light with right-handed circular polarization emitted from the light conversion layer reaches the circular polarizer as left handed circular polarized light, too, which can not pass the polarizer. Only the left-handed circular polarized light emitted from the light conversion layer reaches the circular polarizer and does pass it. However, a significant amount of this light is absorbed and thus does not contribute to the display image. In this case, since the circular polarized light is manipulated the quality of the orientation of the dichroic dye does not have a large influence.

The light emitted from the light conversion layer, which has the opposite handedness compared to the twist sense of the light conversion layer is further blocked by using a cholesteric liquid crystal layer with reverse twist sense. In order to suppress the reflection from this reverse twisted cholesteric liquid crystal layer a dichroic dye may be incorporated into this cholesteric liquid crystal layer.

In one embodiment of the instant invention the broad band cholesteric liquid crystal layer having the reverse twist-sense relative to the light conversion layer may be uses an in-cell polarizer and may be combined with a GH LC cell. Then the GH LC cell blocks the emitted light and the ambient light in a black state and the in-cell type broad band cholesteric LC selects circularly polarized light with only one twist-sense. In this embodiment a dichroic dye is incorporated in the switching liquid crystal layer to suppress the reflection from the cholesteric liquid crystal layer with reverse twist sense in the black state. In this case the normally white mode will be used for a positive dichroic dye. In this case where the cholesteric liquid crystal layer with reverse twist sense is used and a dichroic dye is incorporated in this cholesteric layer and/or in the liquid crystal layer, the light conversion layer is not necessarily a cholesteric liquid crystal layer but a simple light emitting layer may be used instead. Here the cholesteric layer with reverse twist sense has the same effect as an in-cell type polarizer, although the ambient light can not be utilized any more in this embodiment.

Preferred embodiments of the present application are also obvious for the expert from the claims filed with this application, which in this respect form a part of the disclosure of the instant application.

The following examples are intended to illustrate the present invention, without limiting it in any way.

However, the different embodiments, including their compositions, constitutions and physical properties, illustrate to the expert very well, which properties can be achieved by the present invention and in particular in which ranges they can be modified. Especially the combination of the various properties, which can be preferably achieved, is thus well defined for the expert.

The melting point T(C,N), the transition from the smectic (S) to the nematic (N) phase T(S,N) and the clearing point T(N,I) of the liquid crystals are given in degrees centigrade.

In the present application all temperatures are given in degrees centigrade (degrees Celsius, short ° C.), all physical data apply to a temperature of 20° C. and all concentrations are weight percent, all unless explicitly stated otherwise.

In the present application and especially in the following examples, the structures of the liquid crystal compounds are represented by abbreviations, which are also called "acronyms". The transformation of the abbreviations into the corresponding structures is straight forward according to the following three tables A to C.

All groups $C_nH_{2n+1}$, $C_mH_{2m+1}$ and $C_lH_{2l+1}$ are preferably straight chain alkyl groups with n, m and l C-atoms, respectively and —CH=CH— preferably is trans-respectively E vinylene.

Table A lists the symbols used for the ring elements, table B those for the linking groups and table C those for the symbols for the left hand and the right hand end groups of the molecules.

Table D lists exemplary molecular structures together with their respective codes.

TABLE A

| Ring Elements | | |
|---|---|---|
| C | cyclohexane-1,4-diyl | |
| P | 1,4-phenylene | |
| D | 1,3-dioxane-2,5-diyl | |
| DI | 1,3-dioxane-2,5-diyl (inverted) | |
| A | tetrahydropyran-2,5-diyl | |
| AI | tetrahydropyran-2,5-diyl (inverted) | |
| G | 2-fluoro-1,4-phenylene | |
| GI | 3-fluoro-1,4-phenylene | |
| U | 2,6-difluoro-1,4-phenylene | |
| UI | 2,3-difluoro-1,4-phenylene | |
| Y | 2,3-difluoro-1,4-phenylene | |
| L | cyclohex-1-ene-1,4-diyl | |

TABLE A-continued

| Ring Elements | | |
|---|---|---|
| LI | cyclohex-2-ene-1,4-diyl | |
| F | 1-fluoro-cyclohex-1-ene-3,6-diyl | |
| FI | 1-fluoro-cyclohex-1-ene-3,6-diyl (inverted) | |
| M | pyrimidine-2,5-diyl | |
| MI | pyrimidine-2,5-diyl (inverted) | |
| N | pyridine-2,5-diyl | |
| NI | pyridine-2,5-diyl (inverted) | |
| np | naphthalene-2,6-diyl | |
| n3f | trifluoronaphthalene-2,6-diyl | |
| n3fl | trifluoronaphthalene-2,6-diyl | |
| th | 1,2,3,4-tetrahydronaphthalene-2,6-diyl | |
| thl | 1,2,3,4-tetrahydronaphthalene-2,6-diyl | |

TABLE A-continued

Ring Elements

| | | |
|---|---|---|
| th2f | 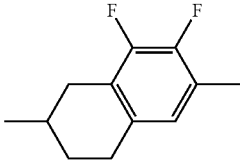 | |
| th2fl |  | |
| o2f | 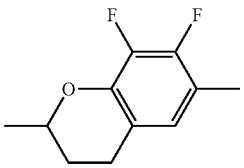 | |
| o2fl | 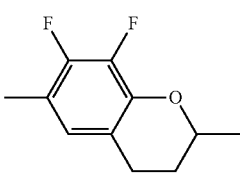 | |
| dh | 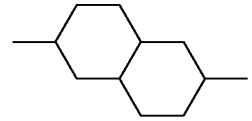 | |
| K | 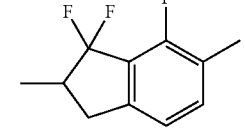 | |
| KI | 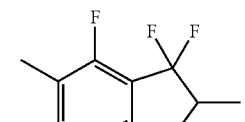 | |

TABLE B

Linking Groups

| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End Groups

| Left hand side, used alone or in combination with others | | Right hand side, used alone or in combination with others | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | CH$_2$=CH— | -V | —CH=CH$_2$ |
| -nV- | $C_nH_{2n+1}$—CH=CH— | -nV | —$C_nH_{2n}$—CH=CH$_2$ |
| -Vn- | CH$_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —$C_nH_{2n}$— | -...n... | —$C_nH_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |

TABLE C-continued

| End Groups | | | |
|---|---|---|---|
| -...K...- | —CO— | -...K... | —CO— |
| -...W...- | —CF=CF— | -...W... | —CF=CF— | wherein n and m each are integers and three points "..." indicate a space for other symbols of this table.

Preferably the liquid crystalline media according to the present invention comprise, besides the compound(s) of formula I one or more compounds selected from the group of compounds of the formulae of the following table.

TABLE D $C_nH_{2n+1}$—⬡—⬡—$C_mH_{2m+1}$

CC-n-m $C_nH_{2n+1}$—⬡—⬡—O—$C_mH_{2m+1}$

CC-n-Om $C_nH_{2n+1}$—⬡—⬡—CH=CH$_2$

CC-n-V $C_nH_{2n+1}$—⬡—⬡—CH=CH—$C_mH_{2m+1}$

CC-n-Vm $C_nH_{2n+1}$—⬡—⬡—(CH$_2$)$_m$—CH=CH—$C_lH_{2l+1}$

CC-n-mVl $C_nH_{2n+1}$—⬡—⬢—$C_mH_{2m+1}$

CP-n-m $C_nH_{2n+1}$—⬡—⬢—O—$C_mH_{2m+1}$

CP-n-Om $C_nH_{2n+1}$—⬢—⬢—(CH$_2$)$_m$—CH=CH—$C_lH_{2l+1}$

PP-n-mVl $C_nH_{2n+1}$—⬡—⬡—⬢—$C_mH_{2m+1}$

CCP-n-m

TABLE D-continued $C_nH_{2n+1}$—⬡—⬢—⬢—$C_mH_{2m+1}$

CPP-n-m $C_nH_{2n+1}$—⬡—⬢—⬢(F)—$C_mH_{2m+1}$

CGP-n-m $C_nH_{2n+1}$—⬢—⬢(F)—⬢—$C_mH_{2m+1}$

PGP-n-m $C_nH_{2n+1}$—⬢—⬢(F)—⬢—(CH$_2$)$_m$—CH=CH$_2$

PGP-n-mV $C_nH_{2n+1}$—⬢—⬢(F)—⬢—(CH$_2$)$_m$—CH=CH—$C_lH_{2l+1}$

PGP-n-mVl $C_nH_{2n+1}$—⬡—⬡—CO—O—⬡—$C_mH_{2m+1}$

CCZC-n-m $C_nH_{2n+1}$—⬡—⬡—CO—O—⬢—$C_mH_{2m+1}$

CCZP-n-m $C_nH_{2n+1}$—⬢—⬢(F)—⬢(F)—⬢—$C_mH_{2m+1}$

PGGIP-n-m $C_nH_{2n+1}$—⬢—⬢(F)—⬢(F,F)—F

PGIGI-n-F

TABLE D-continued
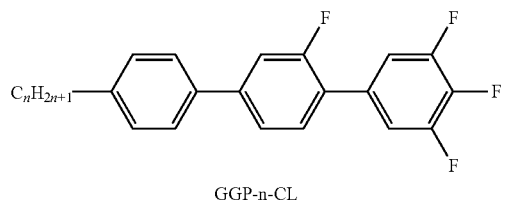
GGP-n-CL
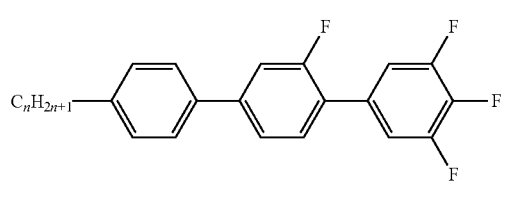
PGU-n-F
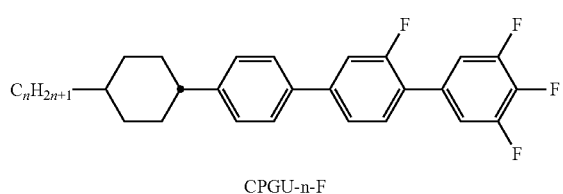
CPGU-n-F
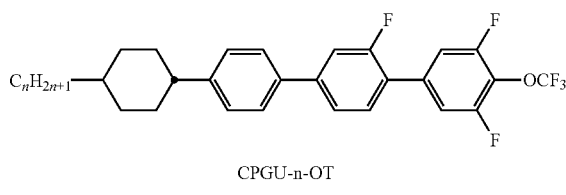
CPGU-n-OT
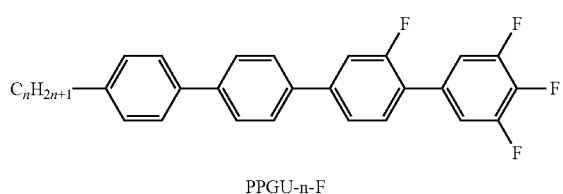
PPGU-n-F
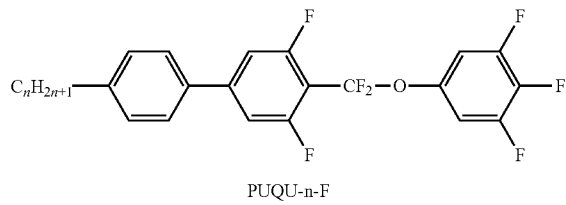
PUQU-n-F
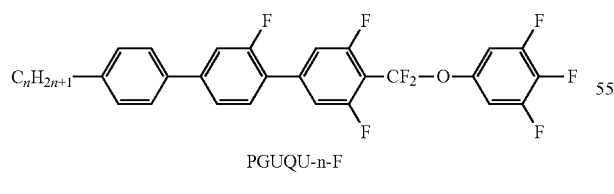
PGUQU-n-F
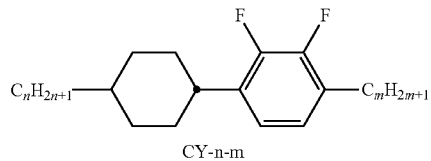
CY-n-m
TABLE D-continued
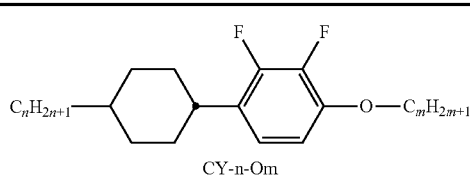
CY-n-Om
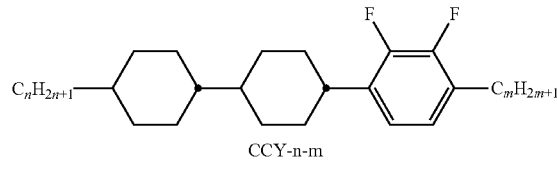
CCY-n-m
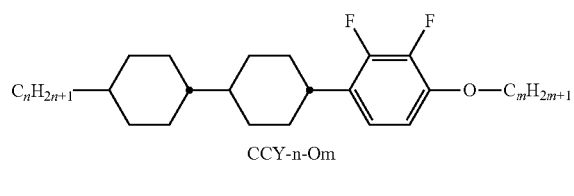
CCY-n-Om
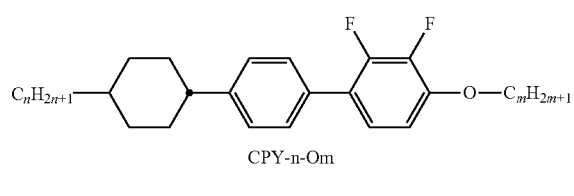
CPY-n-Om
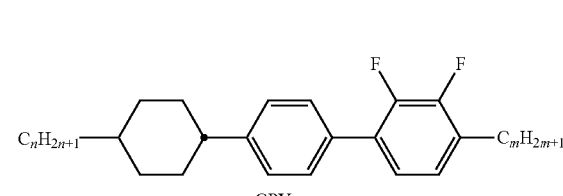
CPY-n-m
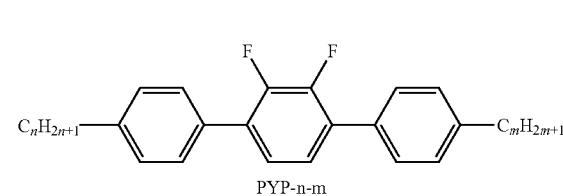
PYP-n-m
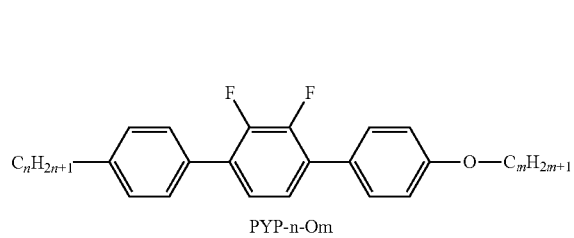
PYP-n-Om
Table E lists chiral dopants, which are preferably used in the liquid crystalline media according to the present invention.

TABLE E
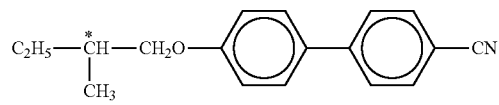
C 15
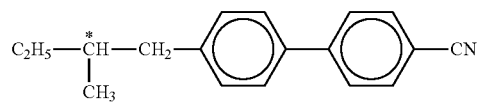
CB 15
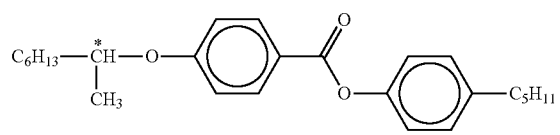
CM 21
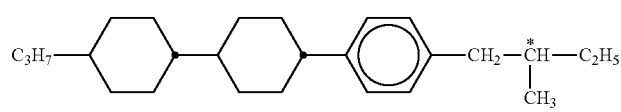
CM 44
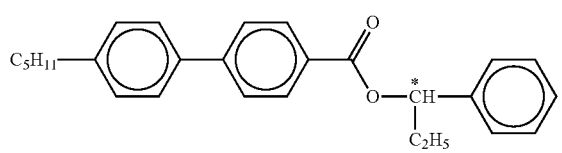
CM 45
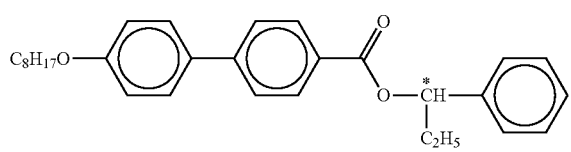
CM 47
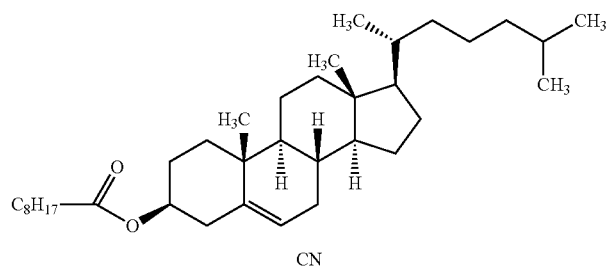
CN
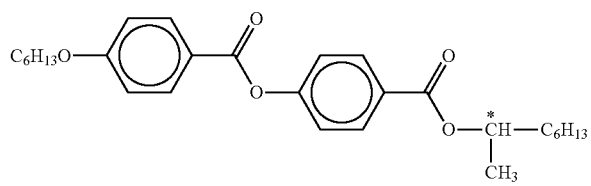
R S-811/S-811

TABLE E-continued
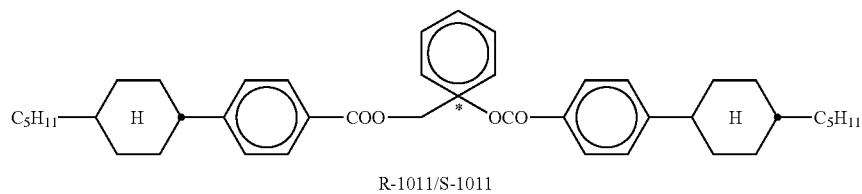
R-1011/S-1011
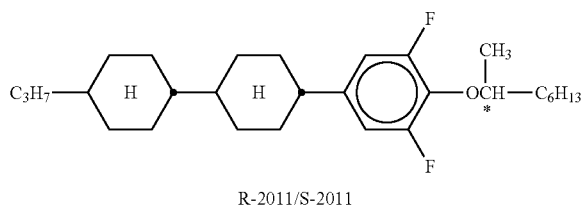
R-2011/S-2011
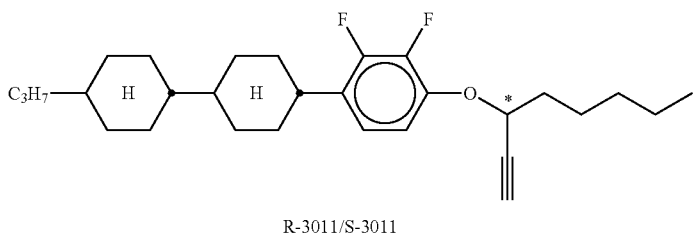
R-3011/S-3011
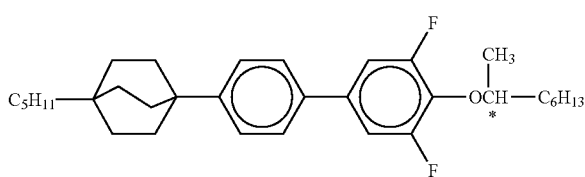
R-4011/S-4011
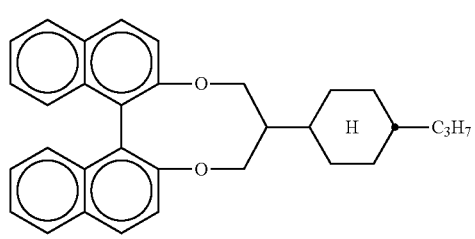
R-5011/S-5011
In a preferred embodiment of the present invention the media according to the present invention comprise one or more compounds selected from the group of compounds of table E.
Table F lists stabilizers, which are preferably used in the liquid crystalline media according to the present invention.
TABLE F
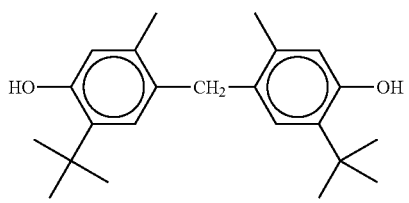
TABLE F-continued
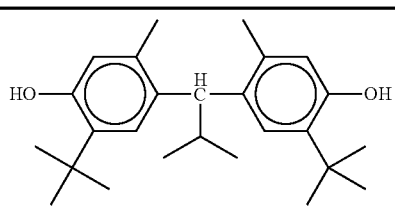
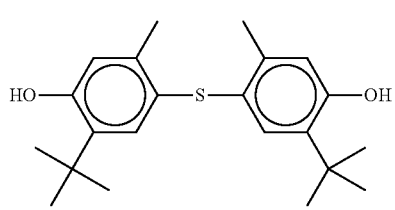

TABLE F-continued
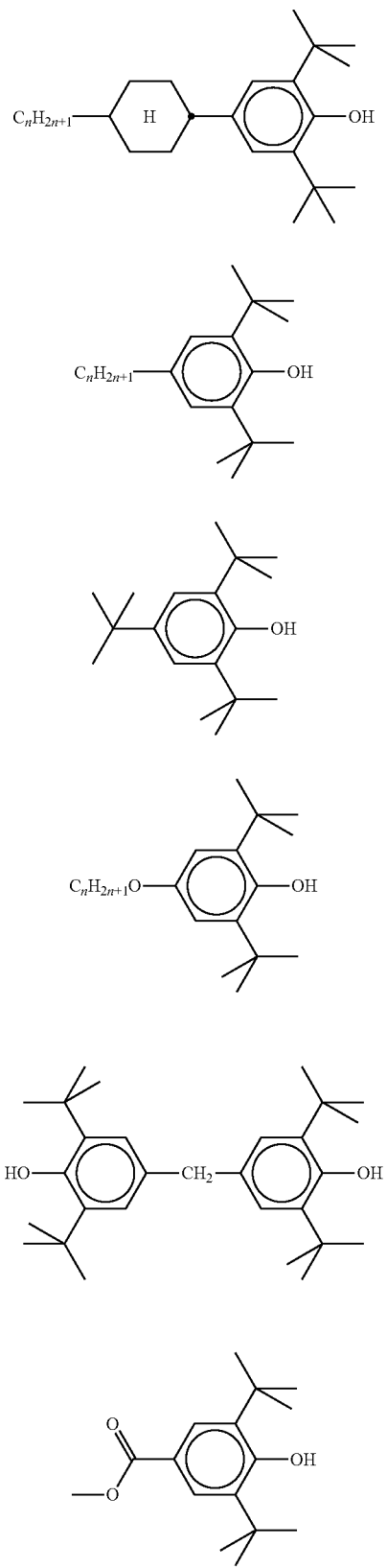
TABLE F-continued
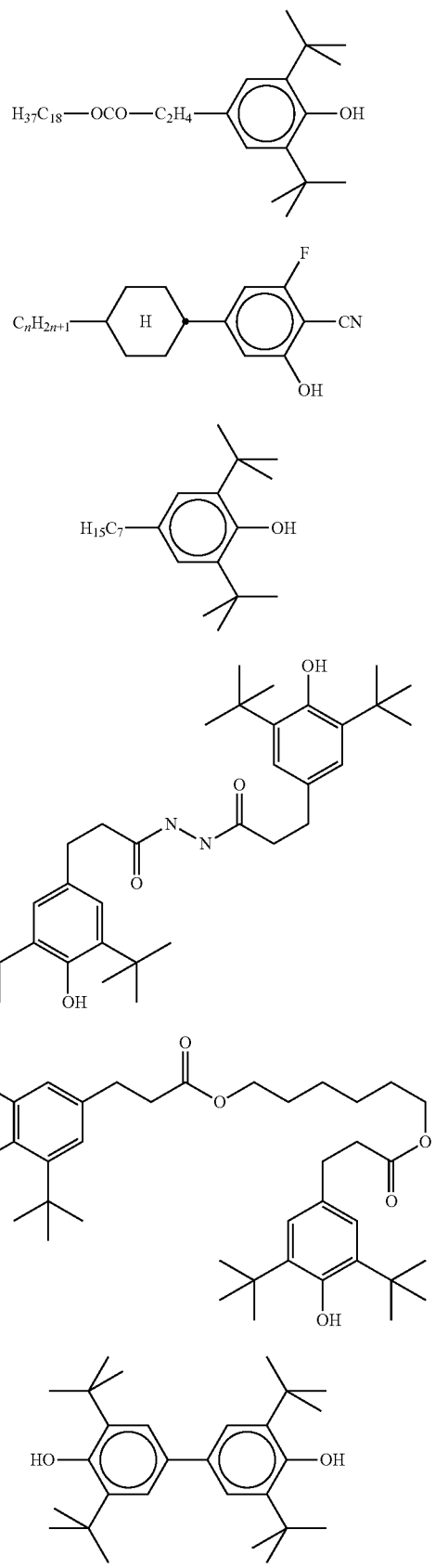

TABLE F-continued
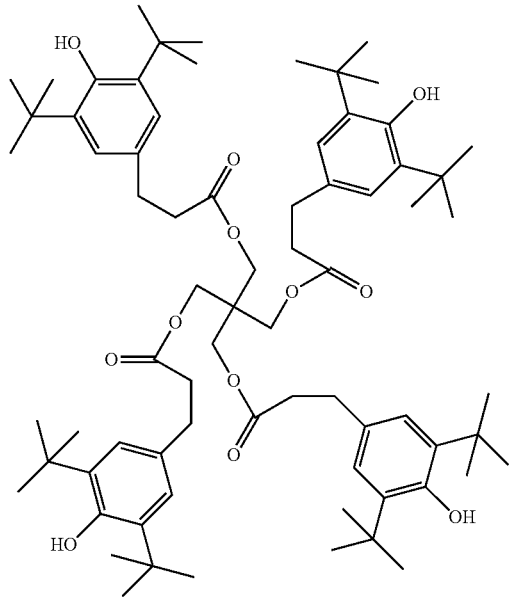 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
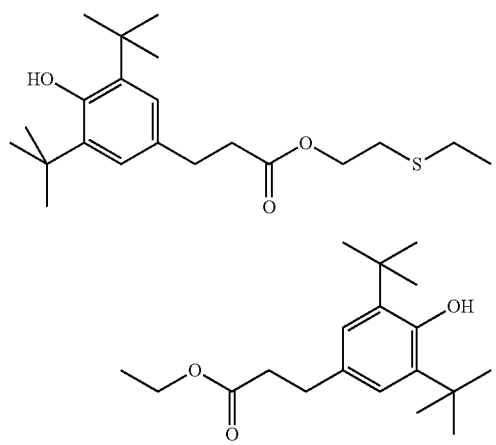
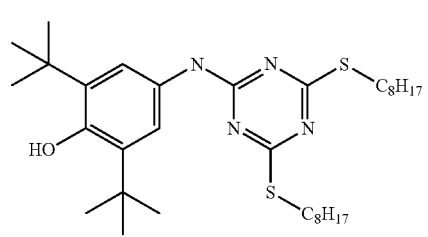
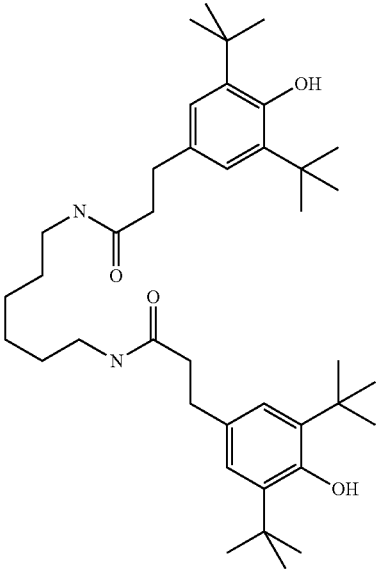 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
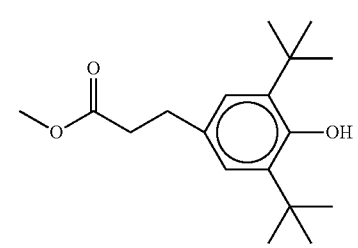
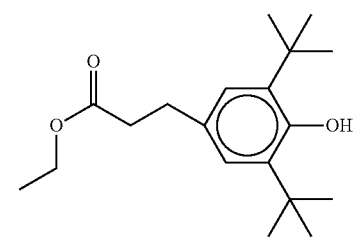
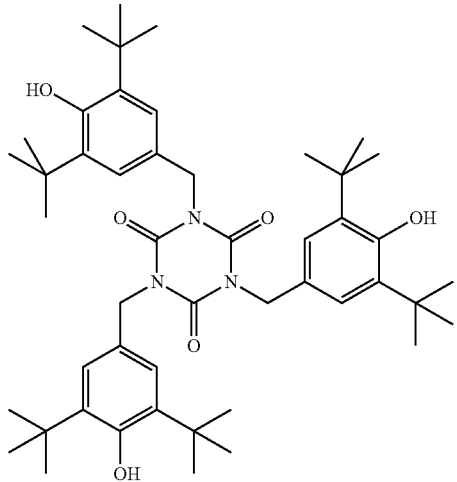 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE F-continued
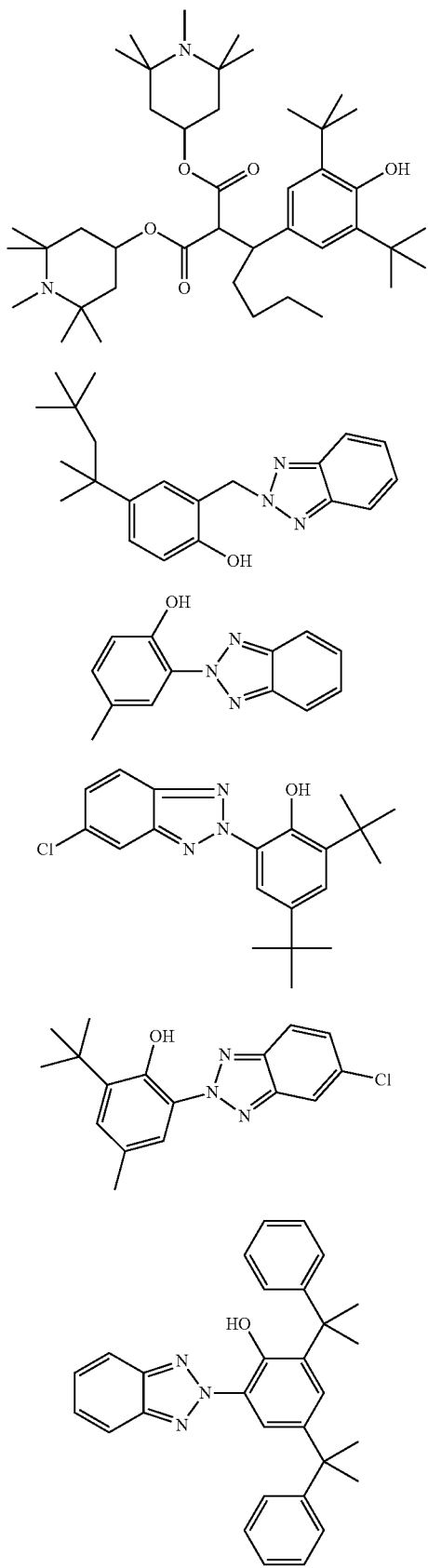
TABLE F-continued
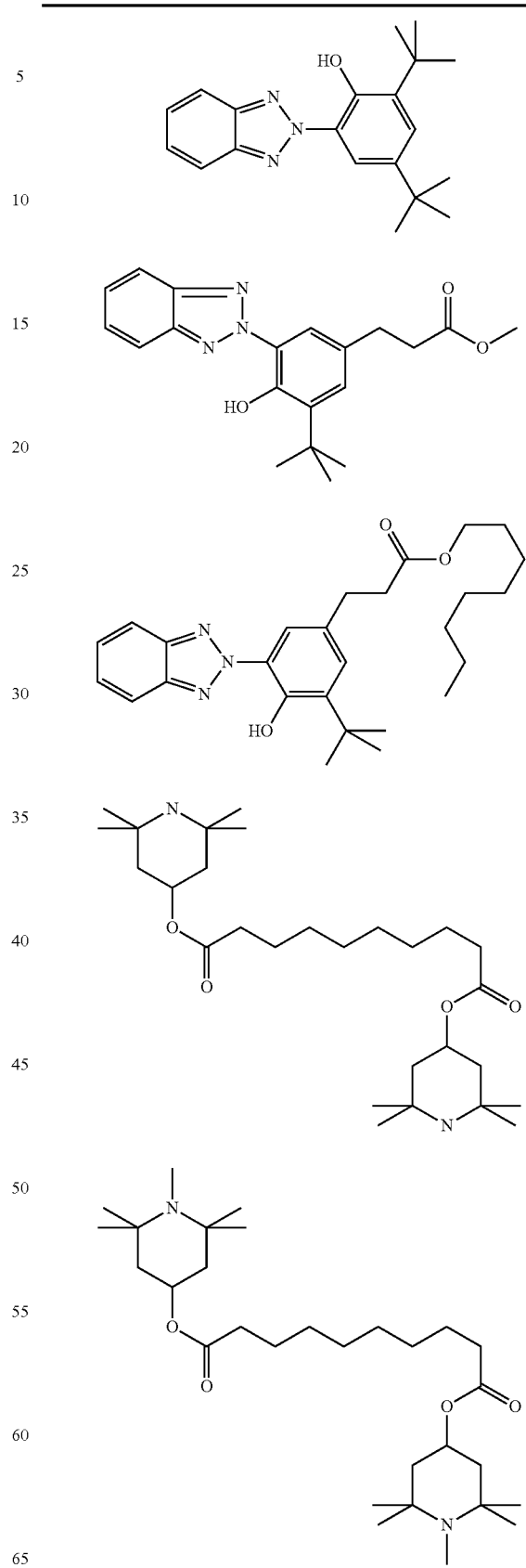

TABLE F-continued

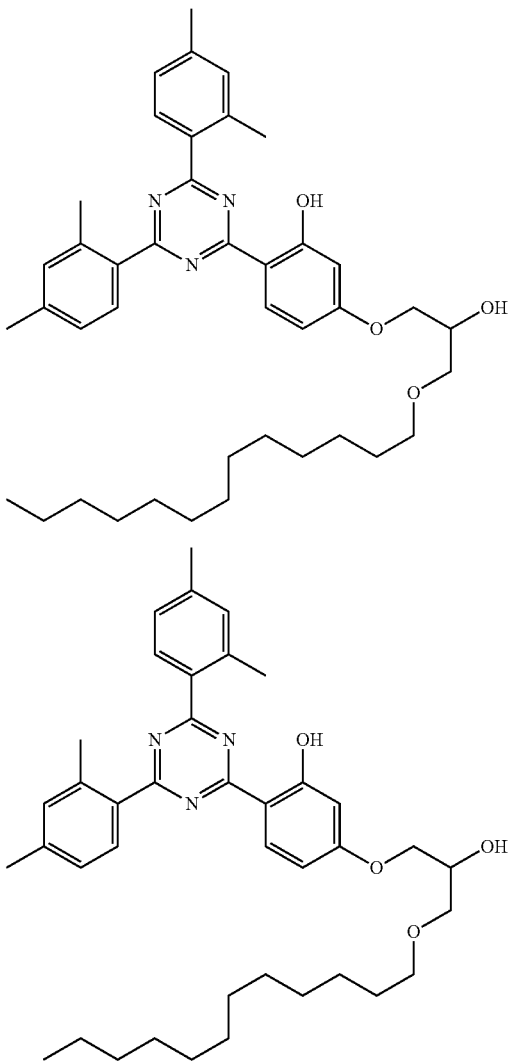

Remark:
In this table "n" means an integer in the range from 1 to 12.

In a preferred embodiment of the present invention the media according to the present invention comprise one or more compounds selected from the group of compounds of table F.

The liquid crystalline media according to the present invention comprise preferably four or more, preferably six or more, compounds selected from the group of compounds of table D, preferably seven or more, preferably eight or more compounds, preferably compounds of three or more different formulae, selected from the group of formulae of table D.

EXAMPLES

The following examples are intended to illustrate the present invention, without limiting it in any way.

However, the different embodiments, including their compositions, constitutions and physical properties, illustrate to the expert very well, which properties can be achieved by the present invention and in particular in which ranges they can be modified. Especially the combination of the various properties, which can be preferably achieved, is thus well defined for the expert.

Example 1

The photo-stability of typical liquid crystal (LC) materials in test cells after exposure to irradiation from a backlight under various conditions is investigated. The voltage holding ratio before and after light exposure is measured for each test cell. Test cells with ITO-electrodes have a cell gap of 6 µm. The orientation layer is a 70 nm thick, rubbed layer of the polyimide AL-60702, from JSR Corporation, Japan, which is prepared by spin-coating of a respective solution and subsequent curing at 200□ for 1 hour. The test cells are exposed to the light from a cold cathode fluorescent lamp, which is used in a typical backlight system of an LCD. The test cells are exposed to the light through various commercially available filters, which cut off the light with a wavelength shorter than a certain value, the so called cut-off wavelength. The cut-off wavelengths (defined as the wavelength where the value of the transmission is less than 5%, width of the flank about some few nm, typically the width of the flank is about (10±1) nm or less of the three different filters used here are 400 nm, 420 nm and 435 nm, respectively. The voltage holding ratio of each cell is measured before and after 1,000 hour exposure. The measurement is performed on the test cell after 5 minutes in an oven at 100° C. For each investigation three test cells are used and their average result is given.

Tables 1 and 2 show the compositions of the two liquid crystal mixtures M-1 and M-2, respectively. The results of this investigation are shown in Table 3. It is clearly seen from the results that the voltage holding ratio of the mixtures decreases when the liquid crystal cells are exposed to light with a short wavelength. However, the voltage holding ratio is only slightly deteriorated, when the liquid crystal cells are exposed only to light having a wavelength of 420 nm or more and it even is influenced less, when the wavelengths of the light are 435 nm or more. Thus, for most practical applications LC materials are stable enough in liquid crystal cells, respectively in LCDs, when they are exposed only to light having a wavelength of 420 nm or more.

TABLE 1

Composition and Properties of Mixture M-1

Composition

| Compound | | Concentration |
|---|---|---|
| No. | Abbrev. | /Mass-% |
| 1 | CY-3-O4 | 10.0 |
| 2 | CY-5-O4 | 10.0 |
| 3 | CCY-2-O2 | 10.0 |
| 4 | CCY-3-O2 | 10.0 |
| 5 | CCY-5-O2 | 6.7 |
| 6 | CCY-2-1 | 10.0 |
| 7 | CCY-3-1 | 6.7 |
| 8 | CC-3-4 | 23.3 |
| 9 | CP-5-3 | 13.3 |
| Σ | | 100.0 |

Physical Properties

T(N, I) = °C.
$n_e$(20° C., 589 nm) =
Δn(20° C., 589 nm) =
$\epsilon_\perp$(20° C., 1 kHz) =

TABLE 1-continued

Composition and Properties of Mixture M-1

| | | |
|---|---|---|
| Δε(20° C., 1 kHz) = | | |
| $K_1$(20° C.) = | | pN |
| $K_3/K_1$(20° C.) = | | |
| $γ_1$(20° C.) = | | mPa·s |
| $V_0$(20° C.) = | | V |

TABLE 2

Composition and Properties of Mixture M-2

Composition

| Compound | | Concentration |
|---|---|---|
| No. | Abbrev. | /Mass-% |
| 1 | CY-3-O4 | 10.0 |
| 2 | CY-5-O4 | 10.0 |
| 3 | CCY-2-O2 | 10.0 |
| 4 | CCY-3-O2 | 10.0 |
| 5 | CCY-5-O2 | 6.7 |
| 6 | CCY-2-1 | 10.0 |
| 7 | CCY-3-1 | 6.7 |
| 8 | CC-3-V1 | 16.7 |
| 9 | CC-3-4 | 6.7 |
| 10 | CP-5-3 | 13.3 |
| Σ | | 100.0 |

Physical Properties

| | | |
|---|---|---|
| T(N, I) = | | °C. |
| $n_e$(20° C., 589 nm) = | | |
| Δn(20° C., 589 nm) = | | |
| $ε_⊥$(20° C., 1 kHz) = | | |
| Δε(20° C., 1 kHz) = | | |
| $K_1$(20° C.) = | | pN |
| $K_3/K_1$(20° C.) = | | |
| $γ_1$(20° C.) = | | mPa·s |
| $V_0$(20° C.) = | | V |

TABLE 3

Light Stability

| | Mixture | | | |
|---|---|---|---|---|
| | M-1 | | M-2 | |
| | HR(100° C.)/% | | | |
| $λ_{cut-off}$/nm | Initial | After Exposure | Initial | After Exposure |
| none | 99.25 | 93.02 | 99.12 | 86.57 |
| 400 | 99.23 | 95.21 | 99.09 | 90.47 |
| 420 | 99.26 | 95.92 | 98.93 | 94.58 |
| 435 | 99.22 | 97.77 | 99.02 | 95.00 |

Remark: The results in the range of 98% and more shown in this table are significant to the third digit given, each, whereas the significance for the lower values becomes less with values of about 85% being significant to the second digit given, only.

Example 2

Liquid crystal test cells are fabricated as follows. Cleaned and dried glass substrates are spin-coating at 1,500 rpm with an appropriate solution of the polyimide alignment layer SE-7492 from Nissan Chemical Co.[Ltd.], Japan. The substrates are pre-heated at 100° C. for 3 min. and then cured at 200° C. for 1 h and subsequently rubbed in one direction. Commercially available polyimide (Kapton Film H type 50H) with a thickness of 12.5 μm is used as a spacer between two substrates and the substrates are assembled with anti-parallel rubbing directions and fixed using polyimide adhesive tape.

Three different cholesteric liquid crystal layers, having different colours, are prepared using the photo-polymerizable liquid crystal material RMM34C commercially available from Merck KGaA, Germany, doped with the commercially available chiral dopant BDH1281 (also Merck KGaA). For the three different colours, i.e. blue, green and red, of the three different cholesteric liquid crystal layers the concentration of the chiral dopant in RMM34C is fixed at 4.63 wt.-%, 3.66 wt.-% and 3.04 wt.-%, respectively. Each one of these three polymerizable mixtures is introduced to a liquid crystal cell, as described above.

The mixtures filled in the cells which are heated up to a temperature of 80° C., at which they are in the isotropic phase and subsequently cooled down to 25° C. at the cooling rate of 0.1°/min. The ranges of the wavelength of selective reflection for each of the films are determined from their absorption spectrum in the UV-visible spectral range. The films with blue, green and red colour, respectively, have ranges of the wavelength of selective reflection of 413 nm to 446 nm, 481 nm to 517 nm and 582 nm to 624 nm, respectively.

Subsequently, in a further set of experiments fluorescent dyes are incorporated into the polymerizable cholesteric mixtures used above. The dyes used are the blue dye, 2,5-bis(5-tert-butyl-2-benz-oxazolyl)thiophene (BBOT), the green dye, Coumarin 6, both from Sigma-Aldrich[ltd.], Japan, and the red dye, NK-3590 purchased from Hayashibara Biochemical Laboratories, Japan. One each of these dyes is introduced into the cholesteric liquid crystal mixture of its respective matching colour, i.e. 0.47 wt.-%, 0.44 wt.-% and 0.49 wt.-%, relative to the respective cholesteric liquid crystal mixtures, for blue, green and red dyes, respectively. As described directly above for the polymerizable cholesteric LC mixtures without dyes, these polymerizable LC mixture dye containing a dye each are filled into a cell, heated to 80° C. and cooling down to 25° C. Then the cholesteric LC structure is stabilized by polymerization initiated by exposure to irradiation by UV. UV radiation with a wavelength of 365 nm is used the dose of exposure is (2,000±50) mJ/cm².

Then, the cells are taken apart, the stabilized films separated and their optical properties investigated. Subsequently these films each are attached to an electro-optically switching liquid crystal test cell and light for excitation, simulating a backlight, is introduced from the side opposite to direction of observation.

The liquid crystal cells used as the electro-optically switching LC cells operate in the vertical alignment mode. They consist of two glass substrates with patterned electrodes of ITO, covered with a polyimide layer introducing vertical alignment. The cell gap is 4.9 μm. The liquid crystal material used in the cells is the nematic mixture M-3, having a birefringence (Δn) of 0.0649 and a dielectric anisotropy (Δε) of −3.1. The composition and physical properties of this mixture are given in the following table (table 4).

TABLE 4

Composition and Properties of Mixture M-3

Composition

| Compound | | Concentration |
|---|---|---|
| No. | Abbrev. | /Mass-% |
| 1 | CY-3-O2 | 11.0 |
| 2 | CY-5-O2 | 11.0 |
| 3 | CCY-3-O2 | 12.0 |
| 4 | CCY-5-O2 | 12.0 |

TABLE 4-continued

Composition and Properties of Mixture M-3

| 5 | CC-3-O1 | 28.0 |
|---|---|---|
| 6 | CC-5-O1 | 14.0 |
| 7 | CCZC-3-3 | 4.0 |
| 8 | CCZC-3-5 | 4.0 |
| 9 | CCZC-4-3 | 4.0 |
| Σ | | 100.0 |

Physical Properties

| $T(N, I) =$ | 71.0° C. |
|---|---|
| $n_e(20°\ C., 589\ nm) =$ | 1.5371 |
| $\Delta n(20°\ C., 589\ nm) =$ | 0.0649 |
| $\epsilon_\perp(20°\ C., 1\ kHz) =$ | 6.7 |
| $\Delta\epsilon(20°\ C., 1\ kHz) =$ | −3.1 |
| $K_1(20°\ C.) =$ | 11.6 pN |
| $K_3/K_1(20°\ C.) =$ | 1.11 |
| $\gamma_1(20°\ C.) =$ | mPa · s |
| $V_0(20°\ C.) =$ | 2.15 V |

Each one of the three coloured cholesteric LC films comprises a dye having a wavelength matching its respective cholesteric pitch. The optical characteristics of the three coloured cholesteric LC films comprising their respective dyes are investigated as follows. BDH1281 is a chiral dopant inducing a chiral helix with right handed twisting sense, which is confirmed here. Alternatively an L-circular polarizer and an R-circular polarizer, both from MeCan Imaging Inc., Japan, are used. The L-circular polarizer consists of a combination of a linear polarizer and a quarter wave plate, in which the slow axis of the quarter wave plate is rotated by 45° relative to the absorption axis of the polarizer, whereas the R-circular polarizer consists of a linear of a polarizer and a quarter wave plate, in which the slow axis of the quarter wave plate is rotated by 135° against the absorption axis of the polarizer.

Either the R-circular polarizer or the L-circular polarizer is placed on the coloured, dyed cholesteric LC film with the side of its quarter wave plate facing the cholesteric film. Then the assembly (stack) is illuminated from the back side of the sample by the excitation light and the light emitted from the cholesteric LC film and transmitted through the circular polarizer used (either the R-circular polarizer or the L-circular polarizer) is measured in the normal to the sample plane using a luminance meter CS-1000 (Konica Minolta Holdings, Inc., Japan). Light reflection of the samples is measured using the same system, but illuminating the sample from oblique direction without switching on the excitation lamp. The results of the intensity of emission for the different films for the excitation with radiation with a wavelength of 365 nm and an intensity of exposure of 1 mW/cm² are shown in Table 5.

TABLE 5

Intensities of Emission

| Circ. Polarizer Colour of Cholesteric Film | $\lambda_{Peek}$/nm | R | L |
|---|---|---|---|
| | | Luminance/cd/m² | |
| Blue | 444 | 101.3 | 62.94 |
| Green | 520 | 145.3 | 137.1 |
| Red | 635 | 94.9 | 170 |

Remark: The results shown in this table are significant to the third digit given, each.

The results for the measurements of reflection are shown in table 6.

TABLE 6

Intensity of Reflection

| Circ. Polarizer Colour of Cholesteric Film | $\lambda_{Peek}$/nm | R | L |
|---|---|---|---|
| | | Luminance/cd/m² | |
| Blue | 447 | 52.59 | 34.14 |
| Green | 523 | 106 | 62.15 |
| Red | 650 | 91.77 | 64.95 |

Remark: The results shown in this table are significant to the third digit given, each.

In the case of the measurements of the reflection no definite conclusion may be drawn, because the effect of reflection from the surface. However, in the case of the measurements of the transmission, respectively the emission, the light with right handed circular polarization seems to have significantly higher intensity for the blue and the green cholesteric dyed films, whereas for the and left handed circularly polarized light seems to be stronger for the red cholesteric dyed film the light with left handed circular polarization seem to have the higher intensity. However, the difference in the intensity between right handed circular polarized light and left handed circular polarized light is not very large and, consequently, the light emitted from the cholesteric dyed LC layers is almost not circularly polarized.

As will be discussed in comparison 1 below, in case an LC cell with a fixed cell gap is used for the cholesteric liquid crystal, to precisely control its morphology and layer thickness, and the rate of cooling down, after heating into the isotropic phase, is also precisely controlled, an enhanced emission peak at the longer edge of the band of selective reflection is clearly observed, due to the cavity effect.

In the case decomposable cells are used, as in example 2, the cavity effect is not observed due to insufficient control of the cell gap. Even in case the cooling rate from the isotropic phase to the cholesteric LC phase is increased by a factor of 5 compared to the value applied above, i.e. increased to 0.5° C./min, to decrease the time needed for the preparation of the cells, no significant changes in the optical properties of the films are recognized.

Next, the optical characteristics of electro-optically switching LC cells in combination with the cholesteric LC films comprising dyes are determined. An R-circular polarizer is attached to the LC cell, which is operating in the vertical alignment mode, in such way that the quarter wave plate of the circular polariser faces the cholesteric liquid crystal film to convert circular polarized light into linear polarized light. Thus, the structure of the assembly is as follows: backlight system, cholesteric liquid crystal film, R-circular polarizer (including a quarter wave plate), an LC switching cell and a linear polarizer.

Similar to the determination of the optical properties of the films themselves described above, both the light transmitted through the assembly now including the LC cell and the light reflected from the assembly is measured using the luminance meter.

In the case that no voltage is applied to the LC cell, a completely black state is achieved. When an appropriate voltage is applied to the LC cell, both the intensity of the light transmitted and of the light reflected increases. Thus it is obvious that the transmissive mode and the reflective mode of operation of the cells in combination with the cholesteric dyed layers both are working in accordance with the response of the LC cell.

The values of the luminance for transmitted light and reflected light, respectively, of each pixel for an operation voltage ($V_{op}$) of 4 V applied to the LC cell are listed in Table 7. The values of the luminance when both the backlight and the ambient illumination are on for an operation voltage of 4 V applied to the LC cell are also listed in Table 7.

The results clearly show that luminance values obtained, in the case both the backlight and the ambient light are on, are almost equal to the sum of the respective luminance values in case alternatively only one of these two light sources (either the back light or the ambient light) is on. Thus, the LCDs consisting of an LC cell, a circular polarizer and a cholesteric liquid crystal film. fabricated in this example, example 2, are utilizing both the transmissive mode and the reflective mode simultaneously. In fact, when this LCD is observed under bright ambient light conditions, as e.g. under open sun light conditions, bright images with clear visibility are achieved. In particular, under the direct sun light conditions, a clear image is displayed even when the backlight is switched off.

TABLE 7

Performance of Test Cells

| Colour of Cholesteric Film | Luminance/cd/m² | | | |
|---|---|---|---|---|
| | Tansmitt. | Reflection | Σ(Tr. + Refl.)* | (Tr.&Refl.)§ |
| Blue | 57.52 | 23.21 | 80.73 | 78.97 |
| Green | 137.7 | 122 | 260 | 273.2 |
| Red | 43.31 | 38.01 | 81.32 | 78.67 |

Remarks: The results shown in this table are significant to the third digit given, each.
*calculated;
§measured.

Comparative Example 1

Again LC cells are prepared, in a similar way as described under example 2. Now, however, spacers having a diameter of 10 μm are used to fix the cell gap of the cells used to stabilize the cholesteric dyed layers. The substrates are held together using a proper equipment applying sufficient pressure while an appropriate hear setting sealing agent is polymerized at a temperature of 150° C. for 1 hour. This method allows an improved control of the resultant cell gap. The polymerizable cholesteric LC mixtures then are filled into the LC cells. These LC cells are again heated to a temperature of 80° C., where the LC is in its isotropic phase, and then cooled down to 25° C. with a cooling rate of 0.1°/min. The resultant cholesteric liquid crystal phases are stabilized by exposure to UV radiation having a wavelength of 365 nm and exposed to a dose of (2,000±50) mJ/cm², as describe above.

The optical properties of the LC cells are determined as describes under example 2 above. The properties under reflection do not differ much from those obtained in example 2. However, the performance under transmission, respectively for emission, shows a clear difference to that of the films of example 2. For blue, green and red cholesteric dyed layers only right handed circular polarized light shows a sharp and enhanced peak of emission. Peak emission intensities for right handed circularly polarized light observed are twice as strong as those of left handed circular polarized light. This enhancement of the intensity of the emission peak in the cholesteric dyed cells with the well controlled cell gap may be attributed to the cavity effect, already mentioned above. It is observed that the absolute values of the luminance are smaller for the cells of this example, for with which the cavity effect is observed compared to those of the films of example 2. This may be explained by the effect called spectrum narrowing. Such a narrower spectrum results in comparative small luminance values. Thus, the cavity effect itself is not expected to contribute to an improvement of the performance of a respective LCD.

Example 3

The emission characteristics of the cholesteric LC layers fabricated in example 2 are determined again, now, however, using a blue LED as a source for the backlight. The LED used has an emission peak at a wavelength of 470 nm and the intensity is 2.9 mW/cm². The results are shown in Table 8.

TABLE 8

Intensities of Emission

| Circ. Polarizer Colour of Cholesteric Film | $\lambda_{Peak}$/nm | R Luminance/cd/m² | L |
|---|---|---|---|
| Blue | 470 | 2,204 | 2,725 |
| Green | 520 | 2,811 | 3,979 |
| Red | 635 | 1,425 | 1,553 |

Remark: The results shown in this table are significant to the third digit given, each.

It is obvious that very strong emission is obtained for each colour. For the cholesteric dyed layers comprising either the green or the red dye this may be explained by the high fluorescence efficiency of these dyes for a wavelength of excitation of 470 nm. The region of selective reflection for the cholesteric dyed layer comprising the blue dye, BBOT, does not include the wave length of 470 nm. Thus the layer does not interact with light having a wave length of 470 nm, which, consequently, passes through the cholesteric LC (light conversion) layer. The reflection properties of the samples are similar to those of the film of example 2. It is shown that the cholesteric LC films equipped with blue LED possesses excellent properties as a backlight system for bright LCD with clear visibility under bright ambient light conditions together with long term reliability.

Example 4

The emission characteristics of the cholesteric LC layers fabricated in example 2 are determined once again, as in example 3. Now, however, a blue LED having an emission peak at a wavelength of 400 nm is used as a source for the backlight. The intensity used is 5.3 mW/cm² here. The results are shown in Table 9.

TABLE 9

Intensities of Emission

| Circ. Polarizer Colour of Cholesteric Film | $\lambda_{Peek}$/nm | R Luminance/cd/m² | L |
|---|---|---|---|
| Blue | 442 | 203.5 | 188.3 |
| Green | 528 | 356.7 | 335.5 |
| Red | 632 | 69.93 | 130.8 |

Remark: The results shown in this table are significant to the third digit given, each.

Thus, it is clearly shown that although the emission is weaker than in example 3, still a quite strong is obtained for every colour, compared with example 2, where excitation with a source at a wavelength of 365 nm is used. It is important to note that here, in example 4, blue light with a short wavelength is obtained, which could not be achieved in example 3. Some LCDs require expression of such deep blue colour and this backlight system in example 4 is preferable. Reflection properties are similar to those of example 2. Similar as in example 3, it is shown that the cholesteric LC films equipped with an LED emitting at a wavelength of 400 nm are characterized by excellent properties as a backlight system for bright LCDs with clear visibility under bright ambient light conditions together with long term reliability.

Example 5

Similar to example 2, cholesteric films are prepared. Now, however, the amount of the chiral dopant BDH1281 is changed to 4.08 wt.-%, and perylene is used as the blue dye. Perylene (1.44 wt.-%) is added to the polymerizable LC mixture and the mixture is dissolved in PGMEA and a solution with a content of 50 wt.-% is obtained. Polyvinylalcohol is spin-coated on glass substrate and after baking at 80° C. for 30 min, the substrate is rubbed. The solution of the polymerizable LC mixture is spin-coated on the polyvinylalcohol alignment layer. After drying at 100° C. for 3 min, the cholesteric LC structure is stabilized by exposure to UV radiation at a wavelength of 365 nm and an dose of exposure of $(2{,}000{\pm}50)$ mJ/cm$^2$ under flowing nitrogen to stabilize the cholesteric phase by photo-polymerization.

The optical properties of the film obtained are investigated as described above under example 4. The results are shown in Table 10.

TABLE 10

Intensities of Emission

| Circ. Polarizer Colour of Cholesteric Film | $\lambda_{Peak}$/nm | R | L |
|---|---|---|---|
| | | Luminance/cd/m$^2$ | |
| Blue | 452 | 516.2 | 634.4 |

Remark: The results shown in this table are significant to the third digit given, each.

A higher luminance is obtained compared with that of example 4, and the region of the wavelength of the selective reflection is close to 450 nm, which means that the reflection in the blue region of the spectrum is easier to see than that in example 2. Reflection properties are almost the same as example 2. It is clearly shown that this backlight system is very well suitable for bright LCDs with good visibility under bright ambient light conditions.

Example 6

Similar to example 2, a cholesteric film is prepared. Now, however, the concentration of the chiral dopant BDH1281 is changed to 3.66 wt.-% and Coumarin 6 is used as green dye. 0.44 wt.-% of Coumarin 6 are added to the reactive LC mixture and the mixture is dissolved in PGMEA and a solution with a content of 50 wt.-% is obtained. The polyimide SE-7492, used already in example 2, is spin-coated on glass substrate, then heated at 100° C. for 3 min, then cured at 200° C. and then the substrate is rubbed. The solution of the polymerisable LC mixture is spin-coated on the rubbed polyimide alignment layer. After drying at 100° C. for 3 min, the cholesteric LC structure is stabilized by exposure to UV radiation at a wavelength of 365 nm and a dose of exposure of $(2{,}000{\pm}50)$ mJ/cm$^2$ under flowing nitrogen to stabilize the cholesteric phase by photo-polymerization.

Figure 12:
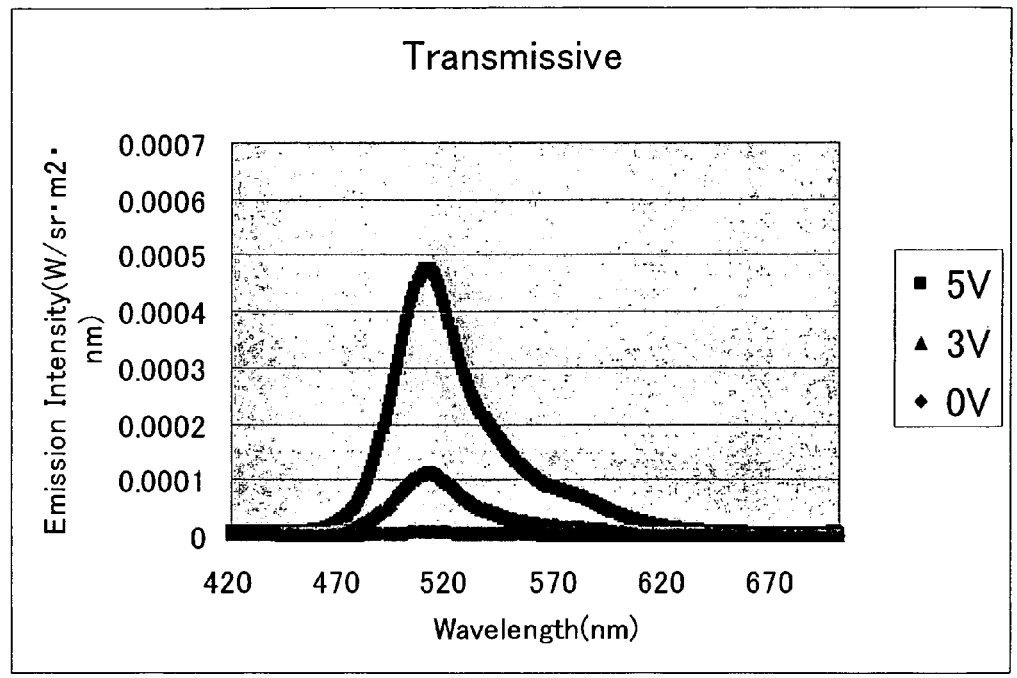
Figure 12:
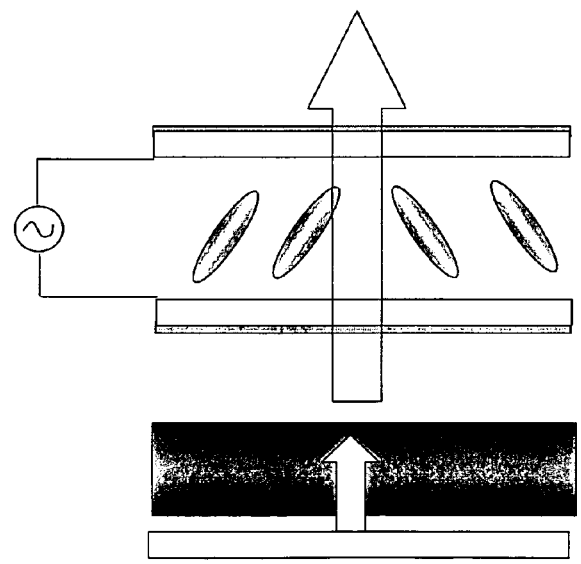
Figure 13:
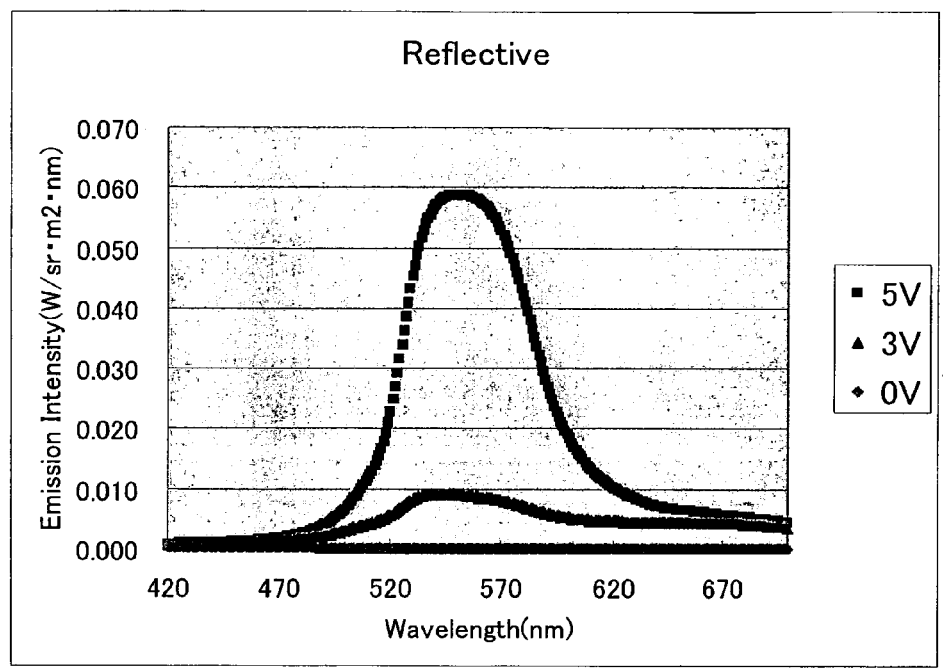
Figure 13:
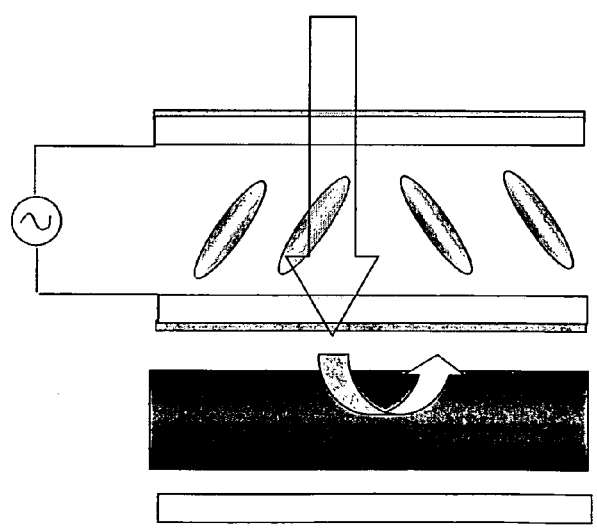

The film obtained is combined with a quarter wave plate and a liquid crystal cell of the VA-type having both a top and a bottom polarizer. As back light, a source of radiation with a wavelength of 365 is used, as described in example 21. The liquid crystal switching cell is addressed with a voltage. The voltage applied is changed from 0 V to 3 V and to 5 V, respectively. Alternatively and advantageously, an alternating current with the same effective voltage ("rms", root mean square) may be applied to the cell. The transmission of the assembly is determined using a luminance meter CS-1000 (Konica Minolta Holdings, Inc., Japan) and subsequently the reflection from the assembly is investigated under the same set of addressing conditions illuminating the sample from oblique direction without switching on the excitation lamp. The results for the operation in transmission are shown in FIG. 12 (a), whereas the respective results obtained for the reflection are shown in FIG. 13 (a). The respective modes of operation investigated in these two FIGS. 12 (a) and 13 (a) are shown schematically in the respective corresponding FIGS. 12 (b) and 13 (b). For an operating voltage of 5 V the maximum of the peak is at a wavelength of 510.5 nm for transmission, whereas it is at about 551.5 nm in reflection. While the peak is rather narrow in transmission, having a width of 40.4 nm (FWHM, ranging from 492.5 nm to 533 nm), it is significantly broader in reflection, having a width of 66 nm (FWHM, from 523 nm to 589 nm). A similar behaviour is observed for an operating voltage of 3 V. Here, the maximum of the peak is at a wavelength of 511.5 nm for transmission with a width of 41.5 nm (FWHM, ranging from 491.5 nm to 533 nm), whereas in reflection the maximum of the peak is shifted to a shorter wavelength compared to operation at 5 V. It is now at a wavelength of about 541 nm. At the same time the width of the peak is increased to about 101 nm (FWHM, ranging from 515 nm to 616 nm). The spectral shape of the spectrum of the reflected light is basically flat. It may be easily tuned by the amount of the chiral dopant used. These data are summarised in the following table.

TABLE 11

Spectral Characteristics

| | Mode | | | |
|---|---|---|---|---|
| | Transmission | | Reflection | |
| $V_{op}$/V | 3 | 5 | 3 | 5 |
| $\lambda_{max}$/nm | 511.5 | 510.5 | 541 | 515.5 |
| $\lambda_{1/2\,und.}$/nm | 491.5 | 492.5 | 515 | 523 |
| $\lambda_{1/2\,upp.}$/nm | 533 | 533 | 616 | 589 |
| $\lambda_{center}$/nm | 512.3 | 512.8 | 565.5 | 556 |
| $\Delta\lambda_{FWHM}$/nm | 41.5 | 40.5 | 101 | 66 |

Remark: The results for the wavelengths shown in this table are significant to the third digit given, each.

As can be seen from the two figures, FIGS. 12.a) and 13.a), the intensity both of the light transmitted and of the light reflected from the assembly clearly follows the addressed state of the liquid crystal switching layer. Thus a respective display element is well operable in transmissive mode with a backlight and also under bright ambient light conditions in reflective mode.

Example 7

Similar to example 5, a cholesteric film is prepared, however, a different blue dye is used.

The dichroic dye F357, from Merck KGaA, Germany, is incorporated into the liquid crystal mixture M-3 described in example 2. The concentration of the dichroic dye used is 3.0%. Alternatively, one each of the two liquid crystal mixtures ZLI-3449-100 and MLC-15600-040, both from Merck KGaA, Germany, are used as host mixtures. Also inn these two cases the concentration of the dichroic dye is kept at 3.0%. Some selected physical properties of the two additional liquid crystal host mixtures (i.e. ZLI-3449-100 and MLC-15600-040) are shown in table 12 below.

TABLE 12

Selected Physical Properties of Two Liquid Crystal Host Mixtures

| Property | Mixture | |
|---|---|---|
| | ZLI-3449-100 | MLC-15600-040 |
| T(N, I)/° C. | 92.5 | 91.2 |
| $n_e$(20° C., 589 nm) | 1.6335 | 1.6398 |
| $\Delta n$(20° C., 589 nm) | 0.1325 | 0.1422 |
| $\epsilon_{\parallel}$(20° C., 1 kHz) | 11.7 | 53.9 |
| $\Delta\epsilon$(20° C., 1 kHz) | 7.8 | 44.2 |

In this example two different kinds of cells are prepared. All three types of them have a patterned ITO electrode on the inner side of each one of their two substrates, which is covered with polyimide inducing homogeneous alignment, which subsequently is treated for homogeneous alignment by rubbing in all cases. The two kinds of cells, however, differ in the assembly of their substrates and/or in their cell gaps as summarised in the following table.

TABLE 13

Characteristics of Different Test Cells

| Type of Cell | 1 | 2 |
|---|---|---|
| Cell Gap/μm | 10.0 | 6.0 |
| Assembly | Antiparallel | Twisted |
| Twist angle/° | 0 | 90 |
| LC Orientation | Homogeneous | Twisted |

In order to check the dichroic ratio of the dichroic dye and the range of the wavelengths of absorption, a mixture of 10% of the dichroic dye F357 in the host mixture ZLI-3449-100 is used. This resultant mixture is introduced into a cell of type 1 and its absorption spectra for linear polarized light is determined both for orientation of the axis of polarization of the polarized light being oriented either parallel or perpendicular to the rubbing direction of the substrates of the cell. The results are shown in table 14 below. It is obvious from the results that the dichroic dye F357 has an absorption in the blue region of the visible spectrum.

TABLE 14

Spectral Characteristics of F357 in ZLI-3449-100

| | Orientation | |
|---|---|---|
| | Parallel | Perpendicular |
| Wave Length/nm | Absorbance/arb. units | |
| 400 | 2.556 | 0.362 |
| 410 | 2.764 | 0.409 |
| 420 | 2.894 | 0.460 |
| 430 | 2.991 | 0.498 |
| 440 | 3.019 | 0.495 |
| 450 | 3.030 | 0.488 |
| 460 | 3.028 | 0.454 |
| 470 | 2.98 | 0.384 |
| 480 | 2.954 | 0.334 |
| 490 | 2.875 | 0.282 |
| 500 | 2.524 | 0.213 |
| 510 | 1.856 | 0.142 |
| 520 | 1.318 | 0.095 |
| 530 | 0.939 | 0.060 |
| 540 | 0.673 | 0.035 |
| 550 | 0.471 | 0.017 |
| 560 | 0.317 | 0.004 |
| 570 | 0.202 | 0.00 |
| 580 | 0.120 | 0.00 |
| 590 | 0.061 | 0.00 |
| 600 | 0.021 | 0.00 |

The three different liquid crystal mixtures doped with the dichroic dye are injected into the each one of the different types of cells. The TN-type cells are used as an LC switching layer, whereas the cells with homogenous alignment are used to check the dichroic ratio and the absorption wavelength range of the dichroic dye F357 in the liquid crystal mixtures.

Next, the cholesteric liquid crystal layer doped with a blue fluorescent dye is prepared similarly as described in example 5. Here, however, Coumarin-500 from Exciton Corporation, USA obtained via Indeco Corporation, Japan is used as the blue dye and that its concentration is fixed at 2.74%. The chiral dopant used again is BDH1281, as in examples 2 and 5. The concentration of the chiral dopant used here is 4.54%. The cell with the cholesteric liquid crystal is excited using an LED emitting violet light having a wavelength of 400 nm.

The emission spectrum of the cholesteric liquid crystal layer doped with the dye is shown in table 15. The emission peak is located at a wavelength of about 466 nm. The maximum value is at about $26.66 \cdot 10^{-3}$ sr·m$^2$·nm.

TABLE 15

Emission Spectrum of a Cholesteric LC Cell

| Wave Length/nm | Intensity of Emission/$10^{-3}$ sr · m$^2$ · nm |
|---|---|
| 430 | 46.65 |
| 440 | 31.15 |
| 450 | 25.41 |
| 460 | 25.88 |
| 470 | 26.10 |
| 480 | 23.34 |
| 490 | 20.30 |
| 500 | 18.26 |

Table 16 gives the reflection spectra of the cholesteric liquid crystal layer doped with the dye for three cases: if no polarizer, if a right-handed circular polarizer and if a left-handed circular polarizer is applied, respectively. The reflection observed here clearly is a selective reflection. The reflection peak is at a wavelength of about 460 nm in all cases.

TABLE 16

Reflection Spectra of a Cholesteric LC Cell

| | Polarizer | | |
|---|---|---|---|
| | None | Right Handed | Left handed |
| Wave length/nm | Intensity of Reflection/$10^{-3}$ sr · m$^2$ · nm | | |
| 430 | 3.366 | 1.569 | 0.193 |
| 440 | 4.288 | 2.141 | 0.242 |
| 450 | 4.983 | 2.599 | 0.284 |
| 460 | 5.205 | 2.745 | 0.322 |

TABLE 16-continued

Reflection Spectra of a Cholesteric LC Cell

| | Polarizer | | |
|---|---|---|---|
| | None | Right Handed | Left handed |
| Wave length/nm | Intensity of Reflection/$10^{-3}$ sr · m$^2$ · nm | | |
| 470 | 4.277 | 2.195 | 0.351 |
| 480 | 3.073 | 1.440 | 0.374 |
| 490 | 2.326 | 0.952 | 0.385 |
| 500 | 2.010 | 0.728 | 0.395 |

The results for the spectra in transmission and in reflection in case a TN cell with MLC-15600-040 doped with the dicroic dye is placed in front of the cell with the cholesteric liquid crystal doped with the blue dye coumarin-500 are given in tables 17 (transmission spectra) and 18 (reflection spectra), respectively. It is obvious from these results that upon application of an increasing voltage both the transmission and the reflection increase significantly.

TABLE 17

Emission Spectra of an Assembly of a TN Cell and a Cholesteric LC Cell for Various Voltages Applied

| | $V_{Applied}$/V | | | | | |
|---|---|---|---|---|---|---|
| | 0.0 | 1.0 | 2.0 | 3.0 | 4.0 | 5.0 |
| λ/nm | Intensity of Emission/$10^{-3}$ sr · m$^2$ · nm | | | | | |
| 430 | 6.16 | 6.23 | 16.17 | 20.72 | 22.51 | 23.46 |
| 440 | 6.04 | 6.00 | 13.73 | 16.98 | 18.29 | 18.99 |
| 450 | 6.56 | 6.51 | 13.83 | 16.82 | 17.86 | 18.41 |
| 460 | 7.95 | 7.87 | 16.05 | 18.97 | 20.09 | 20.65 |
| 470 | 9.74 | 9.59 | 18.55 | 21.33 | 22.34 | 22.84 |
| 480 | 10.30 | 10.15 | 18.61 | 20.91 | 21.77 | 22.06 |
| 490 | 10.28 | 10.16 | 17.96 | 19.56 | 20.19 | 20.43 |
| 500 | 10.85 | 10.77 | 17.90 | 18.95 | 19.20 | 19.37 |

TABLE 18

Reflection Spectra of an Assembly of a TN Cell and a Cholesteric LC Cell for Various Voltages Applied

| | $V_{Applied}$/V | | | | | |
|---|---|---|---|---|---|---|
| | 0.0 | 1.0 | 2.0 | 3.0 | 4.0 | 5.0 |
| λ/nm | Intensity of Reflection/$10^{-3}$ sr · m$^2$ · nm | | | | | |
| 430 | 0.183 | 0.181 | 0.224 | 0.288 | 0.324 | 0.358 |
| 440 | 0.239 | 0.236 | 0.298 | 0.386 | 0.436 | 0.482 |
| 450 | 0.286 | 0.283 | 0.369 | 0.478 | 0.545 | 0.605 |
| 460 | 0.352 | 0.348 | 0.471 | 0.606 | 0.691 | 0.763 |
| 470 | 0.400 | 0.394 | 0.560 | 0.708 | 0.803 | 0.876 |
| 480 | 0.362 | 0.358 | 0.536 | 0.676 | 0.762 | 0.823 |
| 490 | 0.332 | 0.329 | 0.513 | 0.652 | 0.727 | 0.773 |
| 500 | 0.401 | 0.397 | 0.631 | 0.785 | 0.851 | 0.889 |

The invention claimed is:

1. An electro-optical switching element comprising
at least one light converter comprising a cholesteric liquid crystal, which comprises one or more light emitting moieties and wherein said at least one light converter is capable of converting light,
wherein each light converter is capable of converting a state of polarization of the light from non-polarized light to circular polarized light and,
wherein at least one light converter is capable of shifting the wavelength of the light to longer values,
a liquid crystal material, which is capable of switching,
one or more light polarizing devices, and
optionally an illuminator, and
wherein one of said one or more light polarizing devices are positioned between said optional illuminator and said light converter and wherein said light converter is positioned between said one of said one or more light polarizing devices and said liquid crystal material.

2. The electro-optical switching element, of claim 1, which includes an illuminator,
wherein the illuminator is backlight system capable of emitting blue light,
wherein the electro-optical switching element comprises at least two light converters, and
wherein at least one of the light converters is capable of converting the state of polarization of the light from said backlight system to circular polarized light and at the same time, shifting the wavelength of the light to longer values.

3. The electro-optical switching element, of claim 1, wherein the at least one light converter is formed of at least one layer.

4. The electro-optical switching element, of claim 1, wherein the liquid crystal material is aligned.

5. The electro-optical switching element, of claim 4, wherein the liquid crystal material is aligned linearly.

6. The electro-optical switching element, of claim 4, wherein the liquid crystal material is cholesteric.

7. The electro-optical switching element, of claim 1, wherein the light converter additionally comprises one or more dichroic dyes.

8. The electro-optical switching element, of claim 1, wherein the liquid crystal material includes a dichroic dye.

9. The electro-optical switching element, of claim 1, wherein the liquid crystal material has a negative dielectric anisotropy.

10. An array of multiple electro-optical switching elements, of claim 1, comprising a set of three electro-optical switching elements or a multitude of said sets of three electro-optical switching elements, wherein the switching elements in each of said sets are different colors.

11. The array of electro-optical switching elements of claim 10, wherein the at least one light converter has the form of a layer of laminated layers.

12. The array of electro-optical switching elements of claim 10, wherein the at least one light converter has the form of a spatially structured/patterned layer having separate areas for red, green and blue.

13. A liquid crystal display comprising an array of electro-optical switching elements according to claim 10.

14. A method for the display of information comprising displaying information using the electro-optical switching element of claim 1.

15. The method of claim 14 wherein the information is displayed in an electro-optical display.

16. The method of claim 14 wherein the electro-optical switching element is an array of electro-optical switching elements, comprising a set of three electro-optical switching elements or a multitude of said sets of three electro-optical switching elements, and wherein the switching elements in each of said sets have a different color from each other.

17. The method of claim 1 wherein the information is displayed in an electro-optical display.

18. The method of claim 1 wherein the light polarizing devices are an analyzer or a polarizer.

19. The method of claim 1 wherein the light is ambient light and/or light from a backlight system.

* * * * *